United States Patent
Abdelghaffar et al.

(10) Patent No.: US 12,418,442 B2
(45) Date of Patent: Sep. 16, 2025

(54) CONSIDERATION FOR DEMODULATION REFERENCE SIGNAL AND TRACKING REFERENCE SIGNAL QUASI CO-LOCATION RELATIONSHIP

(71) Applicant: QUALCOMM INCORPORATED, San Diego, CA (US)

(72) Inventors: Muhammad Sayed Khairy Abdelghaffar, San Jose, CA (US); Alexandros Manolakos, Escondido, CA (US); Naga Bhushan, San Diego, CA (US); Krishna Kiran Mukkavilli, San Diego, CA (US); Yeliz Tokgoz, San Diego, CA (US); Runxin Wang, San Diego, CA (US); Yu Zhang, San Diego, CA (US); Shimman Arvind Patel, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/758,755

(22) PCT Filed: Feb. 14, 2020

(86) PCT No.: PCT/CN2020/075278
§ 371 (c)(1),
(2) Date: Jul. 13, 2022

(87) PCT Pub. No.: WO2021/159470
PCT Pub. Date: Aug. 19, 2021

(65) Prior Publication Data
US 2023/0068489 A1 Mar. 2, 2023

(51) Int. Cl.
*H04L 25/02* (2006.01)
*H04L 5/00* (2006.01)

(52) U.S. Cl.
CPC ........ *H04L 25/0224* (2013.01); *H04L 5/0051* (2013.01); *H04L 25/0204* (2013.01)

(58) Field of Classification Search
CPC ............... H04L 25/0224; H04L 5/0051; H04L 25/0204; H04L 5/0048; H04L 25/0222; H04B 7/06968
See application file for complete search history.

(56) References Cited

U.S. PATENT DOCUMENTS

2009/0253415 A1* 10/2009 Walker ................... H04N 7/163 725/39
2012/0307772 A1* 12/2012 Kwon .................. H04L 5/0057 370/328

(Continued)

FOREIGN PATENT DOCUMENTS

| CN | 103475606 A | 12/2013 |
|----|-------------|---------|
| CN | 105791180 A | 7/2016  |

(Continued)

OTHER PUBLICATIONS

International Search Report and Written Opinion—PCT/CN2020/075278—ISA/EPO—Oct. 23, 2020.

(Continued)

*Primary Examiner* — Christine Y Ng
(74) *Attorney, Agent, or Firm* — Holland & Hart LLP

(57) ABSTRACT

Methods, systems, and devices for wireless communications are described. A method for wireless communication may include receiving a single frequency networked composite reference signal (SFNed RS) at a first port of a user equipment (UE) and receiving a reference signal (RS) at a second port of the UE that is different than the first port of the UE. The method may also include performing channel estimation for at least one of the first port or the second port based at least in part on receiving the SFNed RS and the RS. A method for wireless communication may include trans- (Continued)

mitting a first portion of an SFNed RS from a first port of a first transmit/reception point to a UE and transmitting a downlink control information message to the UE that indicates at least one transmission configuration indicator state identifier that identifies the SFNed RS.

17 Claims, 17 Drawing Sheets

(56) References Cited

U.S. PATENT DOCUMENTS

| | | | | |
|---|---|---|---|---|
| 2013/0279437 | A1* | 10/2013 | Ng | H04L 27/2655 |
| | | | | 370/329 |
| 2015/0215906 | A1 | 7/2015 | Park et al. | |
| 2015/0230220 | A1 | 8/2015 | Li et al. | |
| 2016/0049970 | A1* | 2/2016 | Nisar | H04L 25/0228 |
| | | | | 375/229 |
| 2016/0143015 | A1* | 5/2016 | Marsch | H04W 52/0216 |
| | | | | 370/329 |
| 2018/0091248 | A1* | 3/2018 | Callard | H04J 11/0023 |
| 2018/0278438 | A1* | 9/2018 | Jung | H04L 5/0053 |
| 2018/0316409 | A1* | 11/2018 | Yoon | H04L 5/0044 |
| 2019/0327115 | A1 | 10/2019 | Zhang et al. | |
| 2022/0217742 | A1* | 7/2022 | Kim | H04L 5/0094 |
| 2022/0304011 | A1* | 9/2022 | Zhang | H04W 72/23 |

FOREIGN PATENT DOCUMENTS

| | | |
|---|---|---|
| CN | 107210792 A | 9/2017 |
| WO | WO-2017177443 A1 | 10/2017 |
| WO | 2018028384 A1 | 2/2018 |
| WO | WO-2019209085 A1 | 10/2019 |
| WO | WO-2019212216 A1 | 11/2019 |
| WO | WO-2021159337 A1 | 8/2021 |

OTHER PUBLICATIONS

Taiwan Search Report—TW110100394—TIPO—Aug. 3, 2024.
Intel Corporation: "Discussion on SEN RRH Deployment and UE Behavior for High Speed Train Scenario", 3GPP TSG-RAN WG4 Meeting #77, R4-157000, 3rd Generation Partnership Project, Mobile Competence Centre, 650, Route Des Lucioles, F-06921 Sophia-Antipolis Cedex, France, vol. RAN WG4, No. Anaheim, CA, United States, Nov. 16, 2015-Nov. 20, 2015, Nov. 9, 2015, 4 Pages, XP051042774, Sections 1, 2.
Intel Corporation: "Views on the Demodulation Requirements for NR HST-SFN Scenario", 3GPP TSG-RAN WG4 Meeting #92, R4-1908203, 3rd Generation Partnership Project, Mobile Competence Centre, 650, Route Des Lucioles, F-06921 Sophia-Antipolis Cedex, France, vol. RAN WG4, No. Ljubljana, Slovenia, Aug. 26, 2019-Aug. 30, 2019, Aug. 16, 2019, pp. 1-8, XP051771199, Sections 1, 2.
Supplementary European Search Report—EP20918519—Search Authority—Munich—Oct. 9, 2023.

* cited by examiner

CONSIDERATION FOR DEMODULATION REFERENCE SIGNAL AND TRACKING REFERENCE SIGNAL QUASI CO-LOCATION RELATIONSHIP

CROSS REFERENCE

The present Application is a 371 national stage filing of International PCT Application No. PCT/CN2020/075278 by ABDELGHAFFAR et al. entitled "DESIGN AND CONSIDERATION FOR DEMODULATION REFERENCE SIGNAL AND TRACKING REFERENCE SIGNAL QUASI CO-LOCATION RELATIONSHIP," filed Feb. 14, 2020, which is assigned to the assignee hereof, and which is expressly incorporated by reference in its entirety herein.

BACKGROUND

The following relates generally to wireless communications, and more specifically to design and consideration for demodulation reference signal and tracking reference signal quasi co-location relationships.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support design and consideration for demodulation reference signal and tracking reference signal quasi co-location relationships, including, but not limited to, for high speed train (HST) single frequency networks (SFNs) (HST-SFNs). Generally, the described techniques relate to improved methods, systems, devices, and apparatuses that support Further Enhanced Multiple-Input Multiple-Output (FeMIMO) in wireless communications systems. The described techniques provide improved efficiency and performance through the design of communication for and the consideration of reference signals, such as demodulation reference signals (DMRSs) and tracking reference signals (TRSs), and quasi co-location (QCL) relationships (e.g., assumptions). Techniques described herein provide enhancement to the support of multiple transmission/reception point (TRP) deployment in wireless communication systems. For example, techniques described herein provide solutions for QCL relationships for one or more DMRSs (e.g., multiple QCL assumptions for one or more DMRS ports such as the same DMRS port), which may target downlink transmissions in some examples. The techniques described herein facilitate backwards compatibility for some wireless communications devices while also providing the described improvements, among other benefits.

In some example multi-TRP deployments, two or more TRPs may communicate reference signals to a user device (UE). The UE may use the reference signals (e.g., tracking reference signals (TRSs)) to determine channel conditions, and possibly multiantenna precoders, for downlink transmissions. Instead of each TRP separately transmitting a reference signal, two or more of the TRPs may send (e.g., concurrently, simultaneously) a same reference signal using a same frequency to the UE. These concurrent or nearly simultaneous, same frequency reference signals may be referred to as single frequency networked (SFNed) reference signals. To the UE, the signaling may appear as if the UE were receiving a single reference signal, which may be the sum of the individual TRPs SFNed reference signals from the two TRPs. In addition to the SFNed reference signals, at least one of the TRPs may send a separate, different reference signal to the UE (which may be referred to herein as an "independent reference signal"). Using transmission configuration indicator (TCI) configuration information, among other examples, to interpret the reference signals and antenna ports, the UE may perform one or more operations, such as performing channel estimation for the channels over which it received the SFNed reference signal and the independent reference signal. The UE may use the channel estimation for the independent reference signal, among other examples, to interpret the individual contributions of the multiple channels for the SFNed reference signal, among other examples. These techniques may improve efficiency at the UE, reduce DMRS overhead, improve channel estimation performance, and be backwards compatible with some other wireless communication systems, among other benefits.

A method of wireless communication is described. The method may include receiving a single frequency networked composite reference signal at a first port of a UE single frequency networked composite reference signal and receiving a reference signal at a second port of the UE that is different than the first port of the UE. The method may also include performing channel estimation for at least one of the first port or the second port based on receiving the single frequency networked composite reference signal and the reference signal.

An apparatus for wireless communication is described. The apparatus may include a processor, memory coupled with the processor, and instructions stored in the memory. The instructions may be executable by the processor to cause the apparatus to receive a single frequency networked composite reference signal at a first port of a UE single frequency networked composite reference signal, receive a reference signal at a second port of the UE that is different than the first port of the UE, and perform channel estimation for at least one of the first port or the second port based on receiving the single frequency networked composite reference signal and the reference signal.

Another apparatus for wireless communication is described. The apparatus may include means for receiving a single frequency networked composite reference signal at a first port of a UE single frequency networked composite reference signal, receiving a reference signal at a second port of the UE that is different than the first port of the UE, and performing channel estimation for at least one of the first port or the second port based on receiving the single frequency networked composite reference signal and the reference signal.

A non-transitory computer-readable medium storing code for wireless communication is described. The code may include instructions executable by a processor to receive a single frequency networked composite reference signal at a first port of a UE single frequency networked composite reference signal, receive a reference signal at a second port of the UE that is different than the first port of the UE, and perform channel estimation for at least one of the first port or the second port based on receiving the single frequency networked composite reference signal and the reference signal.

In some examples of the method, apparatuses, and non-transitory computer-readable medium described herein, receiving the single frequency networked composite reference signal may include operations, features, means, or instructions for receiving the single frequency networked composite reference signal from a first transmit/reception point and a second transmit/reception point, and where receiving the reference signal.

In some examples of the method, apparatuses, and non-transitory computer-readable medium described herein, receiving the single frequency networked composite reference signal may include operations, features, means, or instructions for receiving a first reference signal from a first transmit/reception point at a first frequency resource, and receiving a second reference signal from a second transmit/reception point at the first frequency resource, where the first reference signal and the second reference signal include the same information.

In some examples of the method, apparatuses, and non-transitory computer-readable medium described herein, performing the channel estimation may include operations, features, means, or instructions for determining a first channel condition parameter associated with the second port based on the reference signal, and determining a second channel condition parameter associated with the first port based on the single frequency networked composite reference signal and the first channel condition parameter.

In some examples of the method, apparatuses, and non-transitory computer-readable medium described herein, determining the second channel condition parameter may include operations, features, means, or instructions for determining a first instance of the second channel condition parameter based on the single frequency networked composite reference signal, and subtracting a first instance of the first channel condition parameter from the first instance of the second channel condition parameter to determine a second instance of the second channel condition parameter, where the second instance of the second channel condition parameter includes the second channel condition parameter.

In some examples of the method, apparatuses, and non-transitory computer-readable medium described herein, the first channel condition parameter or the second channel condition parameter may include a Doppler shift parameter, a Doppler spread parameter, an average delay parameter, a delay spread parameter, or a spatial receiver parameter, or any combination thereof.

Some examples of the method, apparatuses, and non-transitory computer-readable medium described herein may further include operations, features, means, or instructions for transmitting, in a radio resource control message, an indication of a compatibility of the UE with one or more constraints, where receiving the single frequency networked composite reference signal may be based on transmitting the indication of the compatibility of the UE.

Some examples of the method, apparatuses, and non-transitory computer-readable medium described herein may further include operations, features, means, or instructions for determining a first quasi co-location relationship between the first port and a demodulation reference signal port at the UE, where performing the channel estimation port may be based on determining the first quasi co-location relationship.

Some examples of the method, apparatuses, and non-transitory computer-readable medium described herein may further include operations, features, means, or instructions for determining a second quasi co-location relationship between the second port and a second demodulation reference signal port at the UE, where performing the channel estimation may be based on determining the second quasi co-location relationship.

Some examples of the method, apparatuses, and non-transitory computer-readable medium described herein may further include operations, features, means, or instructions for receiving a downlink control information message indicating at least one transmission configuration indicator state identifier, where performing the channel estimation may be based on receiving the downlink control information message.

In some examples of the method, apparatuses, and non-transitory computer-readable medium described herein, the downlink control information message further indicates at least a second transmission configuration indicator state identifier, where performing the channel estimation may be based on receiving the downlink control information message.

In some examples of the method, apparatuses, and non-transitory computer-readable medium described herein, the at least one transmission configuration indicator state identifier indicates at least one transmission configuration indicator state pair.

In some examples of the method, apparatuses, and non-transitory computer-readable medium described herein, the at least one transmission configuration indicator state identifier indicates at least one list of transmission configuration indicator states.

Some examples of the method, apparatuses, and non-transitory computer-readable medium described herein may further include operations, features, means, or instructions for periodically receiving an additional single frequency networked composite reference signal at the first port of the UE, where performing the channel estimation may be based on periodically receiving the additional single frequency networked composite reference signal.

Some examples of the method, apparatuses, and non-transitory computer-readable medium described herein may further include operations, features, means, or instructions for periodically receiving at least one additional reference signal at the second port of the UE, where performing the channel estimation may be based on periodically receiving the at least one additional reference signal.

Some examples of the method, apparatuses, and non-transitory computer-readable medium described herein may further include operations, features, means, or instructions for aperiodically receiving at least one additional reference signal at the second port of the UE, where performing the channel estimation may be based on periodically receiving the at least one additional reference signal.

Some examples of the method, apparatuses, and non-transitory computer-readable medium described herein may further include operations, features, means, or instructions for determining that the first port may have a lower port index than the second port, and determining whether a demodulation reference signal port may be orthogonal or single frequency networked based on determining that the first port may have the lower port index than the second port, where performing the channel estimation may be based on determining whether the demodulation reference signal port may be orthogonal or single frequency networked.

Some examples of the method, apparatuses, and non-transitory computer-readable medium described herein may further include operations, features, means, or instructions for receiving a downlink control information message that indicates at least one transmission configuration indicator state that identifies which port of a set of ports at the UE receives the single frequency networked composite reference signal, where receiving the single frequency networked composite reference signal at the first port of the UE may be based on receiving the downlink control information message.

In some examples of the method, apparatuses, and non-transitory computer-readable medium described herein, the single frequency networked composite reference signal and the reference signal may be tracking reference signals or demodulation reference signals.

In some examples of the method, apparatuses, and non-transitory computer-readable medium described herein, the single frequency networked composite reference signal and the reference signal may be associated with a physical downlink shared channel or a physical downlink control channel.

In some examples of the method, apparatuses, and non-transitory computer-readable medium described herein, a subset of the single frequency networked composite reference signal may be transmitted from multiple transmit/reception points of a set of transmit/reception points.

A method of wireless communication is described. The method may include transmitting a first portion of a single frequency networked composite reference signal from a first port of a first transmit/reception point to a UE and transmitting a downlink control information message to the UE that indicates at least one transmission configuration indicator state identifier including information to identify the single frequency networked composite reference signal.

An apparatus for wireless communication is described. The apparatus may include a processor, memory coupled with the processor, and instructions stored in the memory. The instructions may be executable by the processor to cause the apparatus to transmit a first portion of a single frequency networked composite reference signal from a first port of a first transmit/reception point to a UE and transmit a downlink control information message to the UE that indicates at least one transmission configuration indicator state identifier including information to identify the single frequency networked composite reference signal.

Another apparatus for wireless communication is described. The apparatus may include means for transmitting a first portion of a single frequency networked composite reference signal from a first port of a first transmit/reception point to a UE and transmitting a downlink control information message to the UE that indicates at least one transmission configuration indicator state identifier including information to identify the single frequency networked composite reference signal.

A non-transitory computer-readable medium storing code for wireless communication is described. The code may include instructions executable by a processor to transmit a first portion of a single frequency networked composite reference signal from a first port of a first transmit/reception point to a UE and transmit a downlink control information message to the UE that indicates at least one transmission configuration indicator state identifier including information to identify the single frequency networked composite reference signal.

Some examples of the method, apparatuses, and non-transitory computer-readable medium described herein may further include operations, features, means, or instructions for transmitting an reference signal from a second port of the first transmit/reception point to the UE, where the second port may be different than the first port.

Some examples of the method, apparatuses, and non-transitory computer-readable medium described herein may further include operations, features, means, or instructions for periodically transmitting additional reference signals at the second port to the UE, where transmitting the reference signal may be based on periodically transmitting the additional reference signals.

Some examples of the method, apparatuses, and non-transitory computer-readable medium described herein may further include operations, features, means, or instructions for aperiodically transmitting additional reference signals at the second port to the UE, where transmitting the reference signal may be based on aperiodically transmitting the additional reference signals.

Some examples of the method, apparatuses, and non-transitory computer-readable medium described herein may further include operations, features, means, or instructions for receiving, from the UE, an indication of a compatibility of the UE, and determining the compatibility of the UE, where transmitting the first portion of the single frequency networked composite reference signal may be based on whether the compatibility of the UE indicates a first compatibility or a second compatibility, and where transmitting the reference signal may be based on whether the compatibility of the UE indicates the second compatibility.

Some examples of the method, apparatuses, and non-transitory computer-readable medium described herein may further include operations, features, means, or instructions for receiving an indication of the compatibility of the UE in a radio resource control message.

In some examples of the method, apparatuses, and non-transitory computer-readable medium described herein, transmitting the first portion of the single frequency networked composite reference signal from the first port further may include operations, features, means, or instructions for transmitting the first portion of the single frequency networked composite reference signal at a same frequency as a first port of a second transmit/reception point that transmits a second portion of the single frequency networked composite reference signal on the same frequency.

Some examples of the method, apparatuses, and non-transitory computer-readable medium described herein may further include operations, features, means, or instructions for determining a first quasi co-location relationship between the first port at the first transmit/reception point and a second port at a second transmit/reception point that transmits a second portion of the single frequency networked composite reference signal, where transmitting the first portion of the single frequency networked composite reference signal may be based on determining the first quasi co-location relationship.

In some examples of the method, apparatuses, and non-transitory computer-readable medium described herein, transmitting the downlink control information message may include operations, features, means, or instructions for transmitting the downlink control information message that indicates at least a second transmission configuration indicator state identifier.

In some examples of the method, apparatuses, and non-transitory computer-readable medium described herein, the at least one transmission configuration indicator state identifier indicates a transmission configuration indicator state pair.

In some examples of the method, apparatuses, and non-transitory computer-readable medium described herein, the at least one transmission configuration indicator state identifier indicates at least one list of transmission configuration indicator states.

Some examples of the method, apparatuses, and non-transitory computer-readable medium described herein may further include operations, features, means, or instructions for periodically transmitting additional first portions of single frequency networked composite reference signals to the UE, where transmitting the first portion of the single frequency networked composite reference signal may be based on periodically transmitting the additional first portions of the single frequency networked composite reference signals.

In some examples of the method, apparatuses, and non-transitory computer-readable medium described herein, the at least one transmission configuration indicator state identifier identifies which port of a set of ports at the UE may be for receiving the single frequency networked composite reference signal.

In some examples of the method, apparatuses, and non-transitory computer-readable medium described herein, the single frequency networked composite reference signal may be a tracking reference signal or a demodulation reference signal.

In some examples of the method, apparatuses, and non-transitory computer-readable medium described herein, the single frequency networked composite reference signal may be associated with a physical downlink shared channel or a physical downlink control channel.

DETAILED DESCRIPTION

Figure 1:
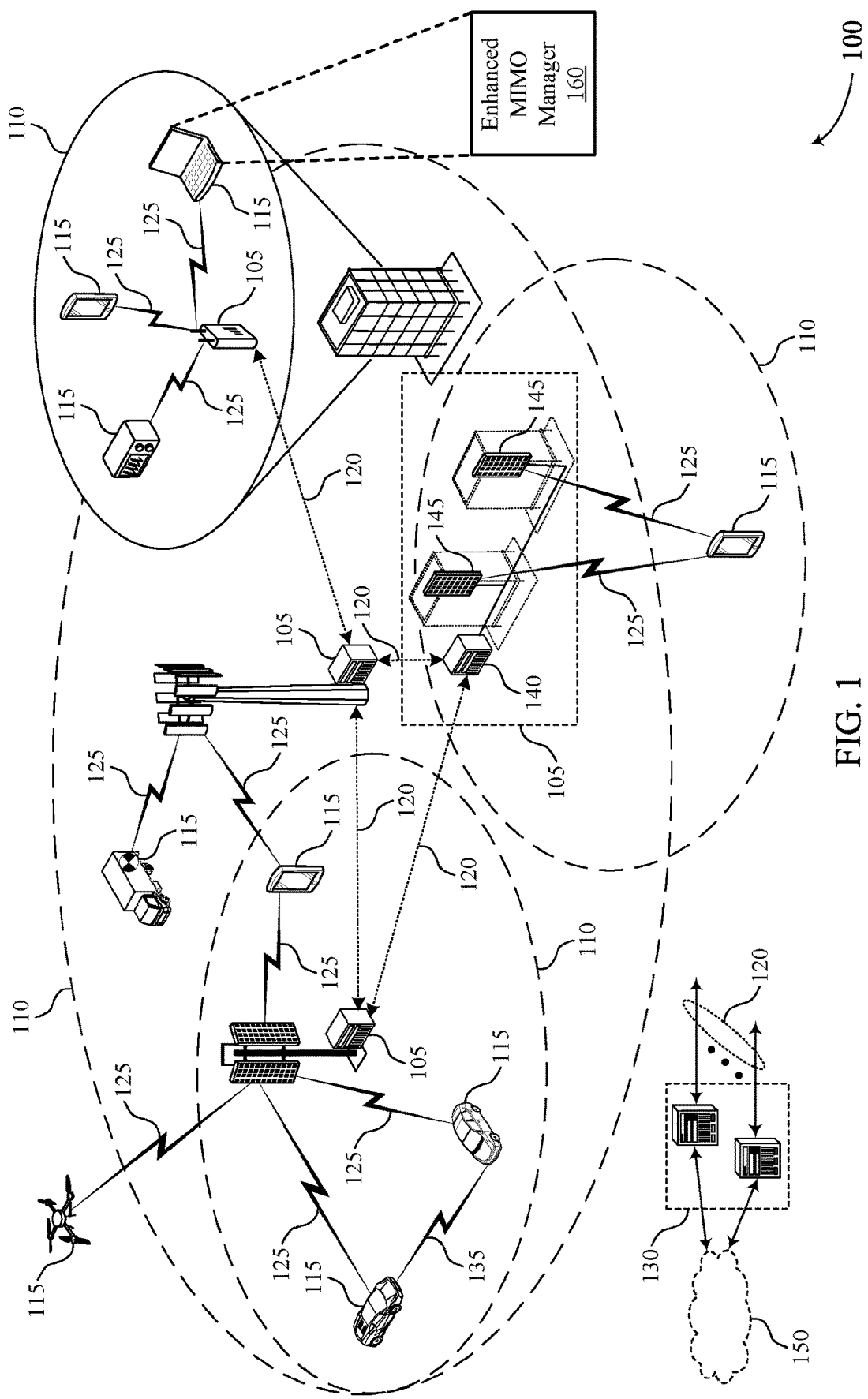
FIG. 1 illustrates an example of a system for wireless communications that supports design and consideration for demodulation reference signal and tracking reference signal quasi co-location relationships in accordance with aspects of the present disclosure.

Some wireless communication systems, such as fifth generation (5G) systems which may be referred to as New Radio (NR) systems, may be designed or configured to efficiently perform downlink multiantenna transmissions. In downlink multiantenna transmissions, such as those associated with Further Enhanced Multiple-Input Multiple-Output (FeMIMO), multiple wireless devices, such as transmission/reception points (TRPs), may concurrently or simultaneously transmit downlink information to a network node, such as a user equipment (UE). To properly interpret received transmissions, a wireless device may need to know one or more properties of a channel over which the one or more transmissions were made. A UE, TRP, or other wireless device may estimate aspects of a channel, such as a radio channel, based on one or more reference signals transmitted over the radio channel between the wireless devices. The channel estimations may assist the wireless device in interpreting received downlink transmissions and in determining relevant channel state information (CSI), among other examples. Techniques described herein may provide improved channel estimation for downlink multiantenna transmissions, including in relatively high speed scenarios.

An antenna may have one or more antenna ports. Signals received at different antenna ports (or that may be subject to different multiantenna precoders) may experience different conditions associated with different radio channels, even if they are transmitted from the same location. An antenna port, in some examples, is a concept where the radio channel over which a symbol on the antenna port is conveyed may be inferred from a radio channel over which another symbol on the same antenna port is conveyed. Quasi colocation (QCL), in some examples, is a concept that assists a wireless device in performing channel estimation, among other operations, because QCL enables a wireless device to make some assumptions or determinations about the relationships between different radio channels associated with different downlink transmissions received at different antenna ports. The wireless device may use QCL assumptions (also referred to herein as QCL relationships) between two or more antenna ports to perform channel estimation for those antenna ports. This helps the wireless device to determine which reference signals should be used for channel estimation for different downlink transmissions or to determine relevant CSI, among other operations.

The described techniques relate to improved methods, systems, devices, and apparatuses that support communication, such as FeMIMO communication, in wireless communications systems. Generally, the described techniques provide improved efficiency and performance through the design and consideration of DMRSs and QCL relationships. Techniques described herein provide enhancement to the support of multiple TRP deployments in wireless communication systems. For example, techniques described herein provide solutions for QCL relationships for DMRS (e.g., multiple QCL assumptions for the same DMRS port), which may be applicable to downlink transmissions. The techniques described herein also preserve backwards compatibility for wireless communications devices while providing the described improvements, among other benefits.

In some example multi-TRP deployments, two or more TRPs may communicate reference signals (e.g., tracking reference signals (TRSs)) to a UE. The UE may use the reference signals to determine channel conditions and, in some examples multiantenna precoders, for downlink transmissions. Instead of each TRP separately transmitting a distinct reference signal, two or more of the TRPs may concurrently or simultaneously send the same reference signal using the same frequency to the UE. These concurrent or nearly simultaneous, same frequency reference signals may be referred to as single frequency networked (SFNed) reference signals. The SFNed reference signals may be nearly simultaneous transmissions from multiple geographically separated antennas. To the UE receiving these SFNed reference signals, the signals may appear as if the UE were receiving a single reference signal. The apparently single reference signal may be a single "sum" signal propagating over a single radio channel, which may be the sum of the individual TRPs SFNed reference signals. The UE may receive and use the overall transmission as a transmission from a single antenna port that may be the same for the two or more SFNed reference signals.

In addition to the SFNed reference signals, at least one of the TRPs may send a separate, different reference signal to the UE. As used herein, a separate reference signal may be referred to as an "independent reference signal" because the independent reference signal may be independent from one or more SFNed reference signals. In some examples, more than one independent reference signal may be transmitted to the UE by one or more different TRPs. The UE may use these one or more independent reference signals to perform channel estimation for the specific antenna ports that received the independent reference signals, but also to interpret the channel estimation for the SFNed reference signals. These techniques may apply, among other examples, to single-port DMRS used in a physical downlink shared channel (PDSCH) or a physical downlink control channel (PDCCH).

Using information, such as transmission configuration indicator (TCI) configuration information, to interpret the reference signals and information related to the antenna ports, the UE may perform channel estimation for the radio channels over which it received the SFNed reference signal and the independent reference signal. Techniques described herein provide for alternatives related to TCI information. The techniques described herein extend to SFNed reference signals transmitted by multiple TRPs, such as three or more TRPs.

The techniques described herein may apply to high speed scenarios, such as high speed train (HST) single frequency networks (HST-SFNs). As a wireless device moves relatively quickly through a cell from which it is receiving communication coverage, conditions of the radio channel, among other aspects, may change rapidly. For example, a UE on a high speed train may experience very different channel conditions from one moment to the next. Among other examples, different channel conditions may include different radio channel properties such as Doppler shift, Doppler spread, average delay, delay spread, or a spatial receiver parameter, other examples, or any combination thereof. For example, a UE may approach a TRP, pass the TRP, and then move away from the TRP within seconds, which may affect the Doppler shift. Other radio channel properties may likewise be affected. The techniques described herein may aid the UE with channel estimation, among other operations, to mitigate at least some of the effects of the rapidly changing channel conditions, for example, in high speed scenarios.

These techniques may improve efficiency at the UE, reduce DMRS overhead, improve channel estimation performance, improve downlink performance, and improve error estimation. Furthermore, these techniques may preserve backwards compatibility with some other different systems.

Aspects of the disclosure are initially described in the context of a wireless communications system. Aspects of the disclosure are described in the context of diagrams that explain the DMRS and QCL assumptions for single frequency networks. Aspects of the disclosure are also described in the context of flow diagrams and flow charts that show the steps of the channel estimation process. Aspects of the disclosure are further illustrated by and described with reference to apparatus diagrams, system diagrams, and flowcharts that relate to design and consideration for demodulation reference signal and tracking reference signal quasi co-location relationships.

FIG. 1 illustrates an example of a wireless communications system 100 that supports design and consideration for demodulation reference signal and tracking reference signal quasi co-location relationships in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support important functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may include one or more UEs 115 and base stations 105 that may support enhancements to DMRS and QCL relationships as described herein. In the example of FIG. 1, a UE 115 may include an enhanced MIMO manager 160. In other examples, additionally or alternatively, a base station 105 may include an enhanced MIMO manager 160. Although various examples discuss an enhanced MIMO manager in different scenarios, the techniques, devices, and other improvements are not limited to MIMO implementations, and should not be construed as being limited unless specifically noted in this disclosure.

The enhanced MIMO manager 160 may receive a single frequency networked composite reference signal at a first port of a UE single frequency networked composite reference signal, receive a reference signal at a second port of the UE that is different than the first port of the UE, and perform channel estimation for at least one of the first port or the second port based on receiving the single frequency networked composite reference signal and the reference signal. The enhanced MIMO manager 160 may be an example of aspects of the enhanced MIMO manager 815 and 1110 described herein.

The enhanced MIMO manager 160 may improve channel estimation, which may lead to improved downlink transmission performance. These techniques may also improve efficiency, reduce or not add to DMRS overhead, improve error estimation, and improve wireless communications performance in high speed scenarios. Furthermore, these techniques may preserve backwards compatibility with some other different systems.

Figure 2:
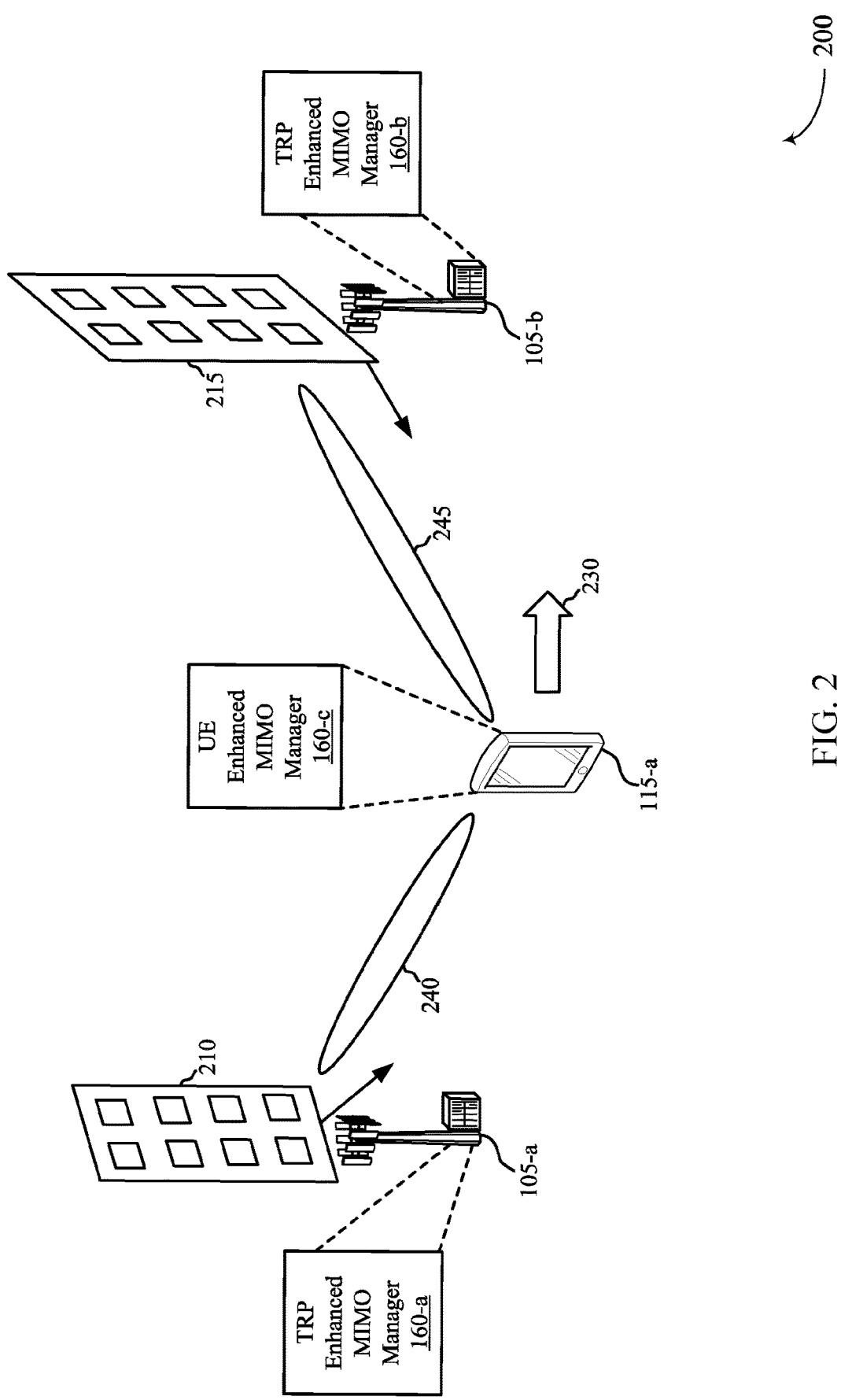
FIG. 2 illustrates an example of a diagram that supports design and consideration for demodulation reference signal and tracking reference signal quasi co-location relationships in accordance with aspects of the present disclosure.

FIG. 2 illustrates an example of a diagram of a wireless communications system 200 that supports design and consideration for demodulation reference signal and tracking reference signal quasi co-location relationships in accordance with aspects of the present disclosure. In some examples, the wireless communications system 200 may be implemented in aspects of wireless communications system 100. The wireless communications system 200 may include two base stations 105-a and 105-b (collectively referred to herein as base stations 105) and a UE 115-a. In some examples, the base stations 105-a and 105-b and the UE 115-a may represent one or more aspects of the base stations 105 and the UEs 115 shown in FIG. 1, respectively.

The base station 105-a may include a TRP enhanced MIMO manager 160-a, which may perform techniques as described herein. Likewise, the base station 105-b may include a TRP enhanced MIMO manager 160-b, which may also perform techniques as described herein. Similarly, the UE 115-a may include a UE enhanced MIMO manager 160-c which may perform the techniques described herein. In some examples, the TRP enhanced MIMO manager 160-a, TRP enhanced MIMO manager 160-b, and the UE enhanced MIMO manager 160-c may represent one or more aspects of the enhanced MIMO manager 160 shown in FIG. 1. For illustrative purposes, the base station 105-a includes an antenna array 210 and the base station 105-b includes an antenna array 215.

The wireless communications system 200 may use single frequency network techniques. The base station 105-a may transmit one or more signals 240 to the UE 115-a. Likewise, the base station 105-b may also transmit one or more signals 245 to the UE 115-a. In some examples, the base stations 105 may transmit a single frequency networked reference signal jointly to the UE 115-a. The SFNed reference signal may be a tracking reference signal that is transmitted from both the base station 105-a and the base station 105-b at the same time and with the same frequency. Additionally, one or more of the base stations 105 may transmit an independent reference signal to the UE 115-a.

In the example of FIG. 2, the UE 115-a is traveling with vector $\vec{v}$ 230, away from the base station 105-a and towards the base station 105-b. The UE 115-a may be traveling with a relatively high speed, such as if it were on a high speed train. Because the UE 115-a is moving away from the base station 105-a and towards base station 105-b, it will see different radio channel conditions between the received transmissions. For example, the radio channel conditions for the signals 240 may be a different than the signals 245. Similarly, the radio channel conditions for the signals 240 at a first moment may be different from the radio channel conditions at a next moment, because the UE has traveled further.

Radio channel properties may include Doppler shift, Doppler spread, average delay, delay spread, or a spatial receiver parameter. Doppler shift is a shift in a frequency of a signal relative to motion of the receiver. For example, the base station 105-a transmits a radio signal at a first frequency, however because the receiver (e.g., the UE 115-a) is in mobility traveling away from the base station 105-a (which may be traveling in the same direction as the waves), the frequency of the radio signal due is reduced. Likewise, the UE 115-a is moving towards the base station 105-b, so it will see signals 245 being at a higher frequency.

Doppler spread may be referred to as a fading rate, which may be the difference between the signal frequency at the transmitter and receiver with respect to time. For example, the difference between the same frequency the base stations 105 transmit the SFNed reference signals versus the frequency the UE 115-a receives the SFNed reference signals at is the Doppler spread.

Average delay may be the average time taken to receive all multi-path components of a signal at the receiver. When a signal is transmitted from multiple antennas, it may reach the receiver via various multiple pathways due to reflections in the environment.

Delay Spread may be the difference between the time of arrival of the earliest significant multi-path component (e.g., often a line of sight (LOS) component) and the time of arrival of the last significant multi-path component.

Spatial Receiver Parameters may refer to beamforming properties of downlink received signals, such as the dominant angle of arrival or the average angle of arrival at the UE 115-a.

By transmitting the SFNed reference signals at the same frequency and at the same time, the UE 115-a may be able to determine the effects due to its travel on the SFNed composite reference signal, such as Doppler shift and Doppler spread. For example, Doppler shift and Doppler spread for the signals 240 from the base station 105-a may be different moment to moment, as well as different from than from the base station 105-b.

SFNed reference signals may assist the UE 115-a in performing more accurate channel estimation. The UE 115-a may receive, at a first antenna port, a SFNed composite reference signal from the base stations 105. The UE 115-a may receive another reference signal at a second antenna port that is different than the first antenna port. The UE enhanced MIMO manager 160-c may perform channel estimation for at least one of the first antenna port or the second antenna port based at least in part on receiving the SFNed composite reference signal and the reference signal. These channel estimations may be applied to the DMRS port at the UE 115-*a*. The UE 115-*a* may separately estimate frequency offsets for two or more base stations 105 based on two or more indicated reference signals. Based on the two estimated frequency offsets, the UE 115-*a* may calculate a proper frequency offset to compensate for channel estimation on the DMRS port.

Figure 3A:
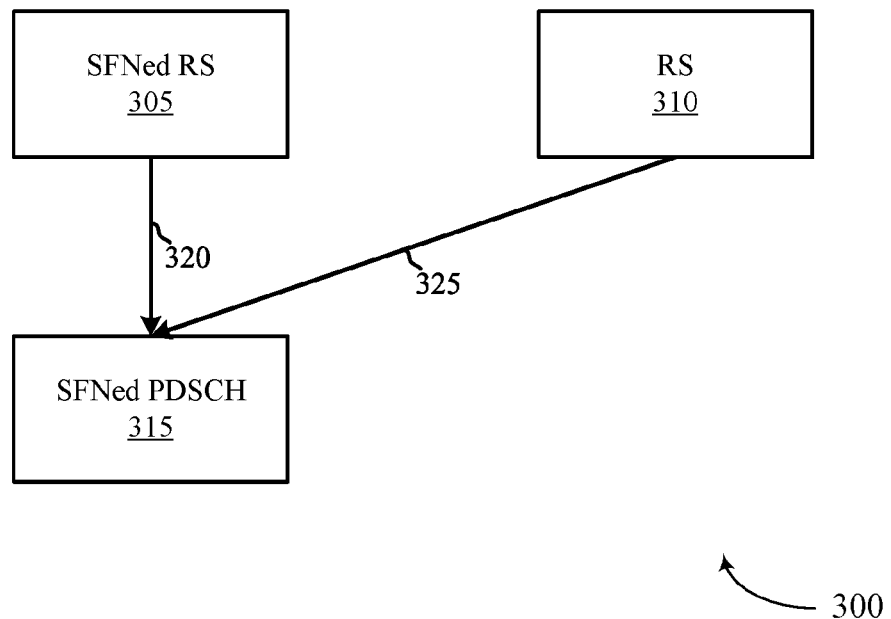
FIGS. 3A and 3B illustrate examples of diagrams of a wireless communications system that supports design and consideration for demodulation reference signal and tracking reference signal quasi co-location relationships in accordance with aspects of the present disclosure.

FIG. 3A illustrates an example of a diagram 300 that supports design and consideration for demodulation reference signal and tracking reference signal quasi co-location relationships in accordance with aspects of the present disclosure. The diagram 300 includes an SFNed reference signal 305 transmitted from a plurality of TRPs to a UE, represented as the SFNed PDSCH 315. A reference signal 310 may also be transmitted to the UE. In the example of FIG. 3A, there are two TRPs and one UE, but the present disclosure is not limited to this example. The diagram 300 may be implemented in the wireless communications systems 100 and 200 of FIGS. 1 and 2, respectively.

In some other different systems, one DMRS port may be QCLed to multiple TRSs. A port being QCLed to another port may be interpreted as that there is known a QCL relationship between the ports. In such a system, a targeted reference signal (TRS) may be transmitted separately from each TRP. Multiple TCI states may be indicated to the UE, each of them corresponding to the TRS for one of the TRPs. The UE may independently estimate Doppler profiles for each TRP. A single port DMRS (SFN) may be used in PDSCH or PDCCH. However, in this scenario, the composite channel (the TRSs) may still be estimated from 1-port DMRS. Furthermore, this may not be backwards compatible with other SFN solutions and operation constraints (such as 3GPP Release 16).

Techniques described herein provide alternatives that improve performance and maintain backwards compatibility with other operation constraints, such as 3GPP Release 16. In the example of FIG. 3A, the TRSs may be configured such that one TRS port may be SFNed and transmitted from both TRPs, represented as SFNed RS 305. This may provide backwards compatibility with other operation constraints, such as 3GPP Release 16. Additionally, however, one TRS port may be transmitted independently from one of the TRPs. This may be represented as RS 310. In some examples, either TRP may transmit the RS 310. The single-port DMRS, represented as SFNed PDSCH 315, may be used in a PDSCH or a PDCCH.

For this scenario, two TCI states may be indicated to the UE. One TCI state may be for the joint transmission (e.g., SFNed RS 305) and the other TCI may correspond to the TRS of one TRP (e.g., RS 310). The doppler profile of one TRP (e.g., from RS 310) may be estimated independently and the profile for the other TRP may be inferred from the SFNed TRS (e.g., SFNed RS 305). Each DMRS port of the PDSCH may be associated with both TCI states. In some examples, the downlink control information may include a new information element to signal the TCI states.

In the example of FIG. 3A, two QCL assumptions may be made. First, there may be a QCL relationship 320 between the ports for the joint SFNed RS 305 transmission. There may be a second QCL relationship 325 between the DMRS port and the separate TRS, RS 310. These QCL relationships may aid the UE in performing channel estimation. This configuration may be determined before the transmissions in some implementations, for example, in a radio resource control (RRC) message. For example, the RRC control message may include QCL parameters that identify the QCL relationships 320 and 325.

Channel conditions for the different radio channels, such as the Doppler profile, may be estimated independently. Given that the radio channel between the UE and the TRP that transmitted the SFNed RS 305 may be represented as H1, and that the radio channel between the UE and the other TRP may be represented as H2, H2 may be determined despite the UE not receiving an individual RS 310 from the other TRP. The radio channel, H2, may be estimated using the link between the UE and the TRP which transmitted the SFNed RS 305. Because the UE received the SFNed TRS, which is a combined transmission, (e.g., H1+H2), this may be used to determine H2. Because the UE may determine H1, it may determine H2 by subtracting H1 from the radio channel conditions of the combined transmission, among other examples.

Alternatives to this scenario may include, among other examples, that more than two TRPs may transmit the SFNed RS 305 and that more than one TRP may transmit one or more RSs 310. Additionally, more than one DMRS port may be used. In this example, two ports may be used. In some examples, one port may be transparent and the other may be non-transparent.

These techniques may provide backward compatibility with a UE that runs according to other operation constraints, such as 3GPP Release 16, may provide improved channel estimation performance, may provide for improved handovers, may eliminate extra DMRS overhead, and may have at least the same TRS overhead (if not better) as other different schemes. These techniques may be applied to control channels as well as data channels.

Figure 3B:
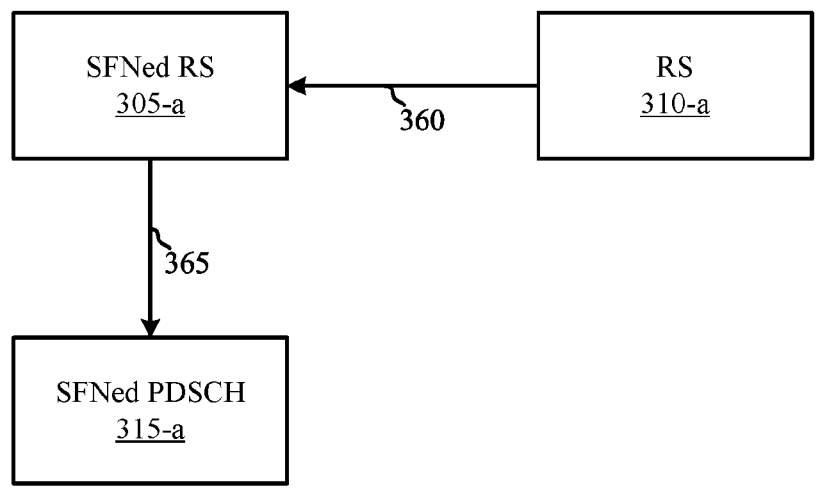

FIG. 3B illustrates an example of a diagram 350 that supports design and consideration for demodulation reference signal and tracking reference signal quasi co-location relationships in accordance with aspects of the present disclosure. The diagram 350 includes an SFNed reference signal 305-*a* transmitted from a plurality of TRPs to a UE, represented as the SFNed PDSCH 315-*a*. A reference signal 310-*a* may also be transmitted to the UE. In the example of FIG. 3A, there are two TRPs and one UE, but the present disclosure is not limited to this example. The diagram 350 may be implemented in the wireless communications systems 100 and 200 of FIGS. 1 and 2, respectively. The signals 305-*a,* 310-*a,* and 315-*a* may be aspects of one or more examples of the signals 305, 310, and 315 of FIG. 3B, respectively.

The diagram 350 illustrates an example relationship between the ports between the TRPs that send the SFNed RS 305-*a,* the TRP that transmits the RS 310-*a,* and the UE with the SFNed PDSCH 315-*a.* For this scenario, two TCI states are indicated to the UE. One TCI state is for the joint transmission (e.g., SFNed RS 305) and the other TCI corresponds to the TRS of one TRP (e.g., RS 310). The doppler profile of one TRP (e.g., from RS 310) may be estimated independently and the profile for the other TRP may be inferred from the SFNed TRS (e.g., SFNed RS 305). Each DMRS port of the PDSCH may be associated with both TCI states. In some examples, the downlink control information may include a new information element to signal the TCI states.

However, as an alternative to the example of FIG. 3A, the QCL assumptions in FIG. 3B may be different. At the DMRS of the UE, there is a QCL relationship 365 between it and the SFNed RS 305-*a.* However, there is also a QCL relationship 360 between the port that transmits the joint SFNed RS 305-*a* and the port at the TRP which independently transmits the RS 310-*a*. These QCL relationships may aid the UE in performing channel estimation.

What is being indicated to the UE may be different between the examples of FIGS. 3A and 3B. From the perspective of the UE, it may detect or determine one TCI state and one transmission (e.g., the SFNed RS 305-*a*). However, if the UE is configured with two TCI states, it may determine or detect the extra information of H1, so it may determine H2. This configuration may be signaled, among other examples, in an RRC message transmitted before the reference signals. For example, the RRC message may include QCL parameters that identify the QCL relationships 360 and 365.

Figure 4A:
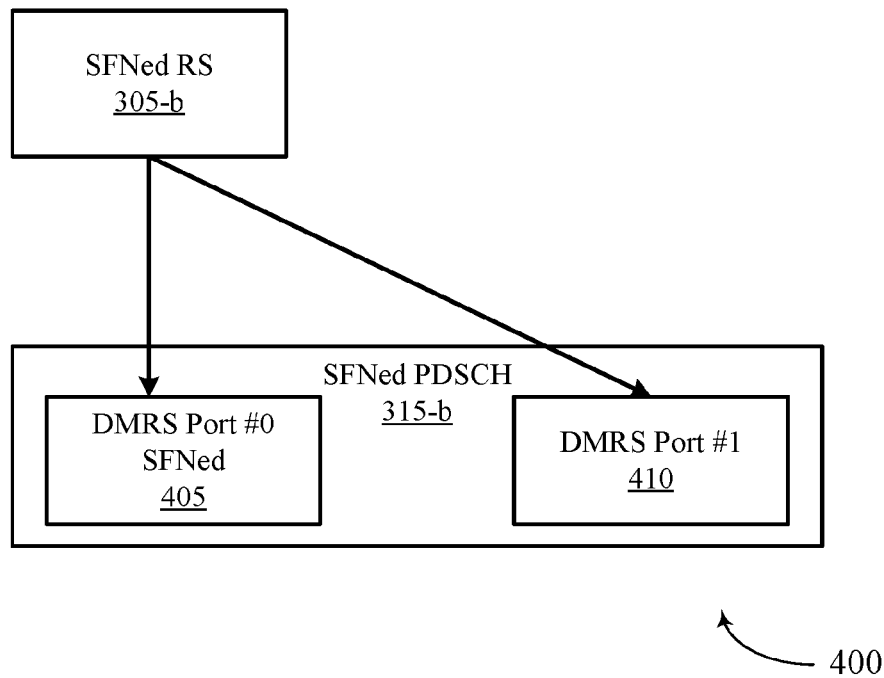
FIGS. 4A and 4B illustrate additional examples of diagrams of a wireless communications system that supports design and consideration for demodulation reference signal and tracking reference signal quasi co-location relationships in accordance with aspects of the present disclosure.

FIG. 4 illustrates an example of a diagram 400 that supports design and consideration for demodulation reference signal and tracking reference signal quasi co-location relationships in accordance with aspects of the present disclosure. The diagram 400 includes an SFNed reference signal 305-*b* transmitted from a plurality of TRPs to a UE, represented as the SFNed PDSCH 315-*b*. The SFNed PDSCH may have two DMRS ports, DMRS port #0 405 and DMRS port #1 410. The DMRS port #0 405 may receive the SFNed RS 305-*b*. In the example of FIG. 4A, there are two TRPs and one UE, but the present disclosure is not limited to this example. The diagram 400 may be implemented in the wireless communications systems 100 and 200 of FIGS. 1 and 2, respectively. The SFNed reference signal 305-*b* and the SFNed PDSCH 315-*b* may be examples of one or more aspects of the SFNed reference signal 305 and the SFNed PDSCH 315 of FIGS. 3A and 3B.

The TRSs are configured such that one TRS port is SFNed and transmitted from both TRPs, represented as SFNed reference signal 305-*b*. A single TCI state is indicated to the UE for the joint SFNed reference signal 305-*b* transmission. However, in alternative to the examples of FIGS. 3A and 3B, two DMRS ports, DMRS port #0 405 and DMRS port #1 410, are configured. The first port, DMRS port #0 405, is used in the PDSCH and is SFNed. The DMRS port #0 405 may see H1+H2. The second port, DMRS port #1 410, is independent (e.g., non-transparent or orthogonal) and is transmitted from one of the TRPs. The DMRS port #1 410 may see H1. In some examples, the DMRS port #1 410 functions as a dummy or test port and does not receive any data signals.

The Doppler profile of one TRP may be estimated from the independent DMRS port and the Doppler profile for the other TRP may be inferred from the SFNed DMRS port.

These techniques provide backward compatibility with a UE that runs according to other operation constraints, such as 3GPP Release 16, provides improved channel estimation performance, may improve handovers, and has lower TRS overhead than other different schemes. These techniques may be applied to control channels as well as data channels.

Figure 4B:
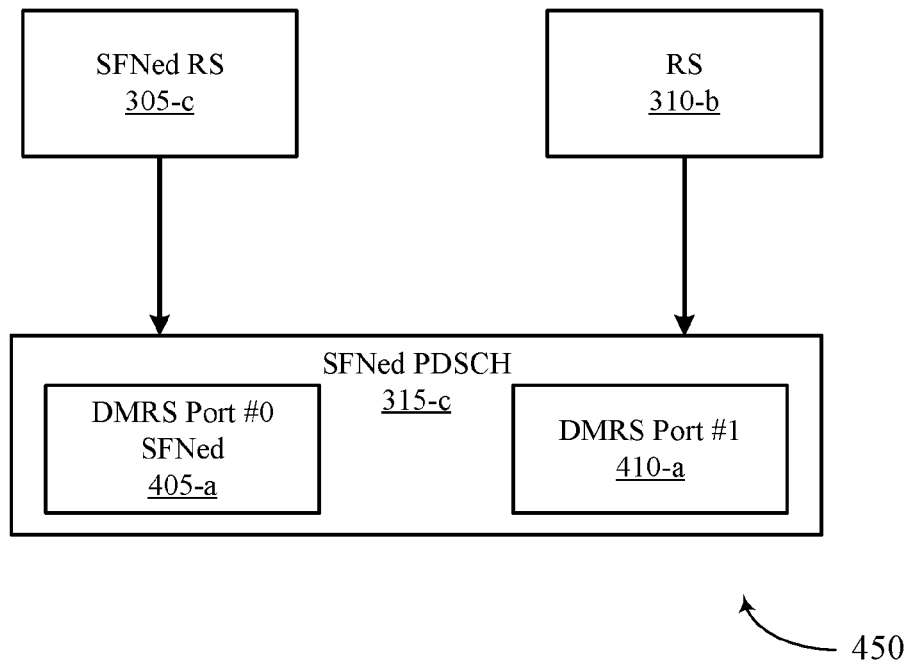

FIG. 4B illustrates an example of a diagram 450 that supports design and consideration for demodulation reference signal and tracking reference signal quasi co-location relationships in accordance with aspects of the present disclosure. The diagram 450 includes an SFNed reference signal 305-*c* transmitted from a plurality of TRPs to a UE, represented as the SFNed PDSCH 315-*c*. The SFNed PDSCH 315-*c* may have two DMRS ports, DMRS port #0 405-*a* and DMRS port #1 410-*a*. The DMRS port #0 405-*a* may receive the SFNed RS 305-*c*. A TRP may also transmit an RS 310-*b* to the SFNed PDSCH 315-*c*. In the example of FIG. 4B, there are two TRPs and one UE, however in other examples there may be more, and the present disclosure is not limited to this example. The diagram 450 may be implemented in the wireless communications systems 100 and 200 of FIGS. 1 and 2, respectively. The SFNed reference signal 305-*c*, the RS 310-*b*, and the SFNed PDSCH 315-*c* may be examples of one or more aspects of the SFNed reference signal 305, RS 310, and the SFNed PDSCH 315 of FIGS. 3A, 3B, and 4A.

TCI states may be used to indicate which DMRS port, DMRS port #0 405-*a* or DMRS port #1 410-*a*, is orthogonal and which is SFNed. In the example of FIG. 4B, multiple TCI states may be indicated to the UE. There may be a TCI state indicated for the joint transmission as described above. Additionally, the independent DMRS port, DMRS port #1 410-*a*, may be linked to the single TRP TCI state. However, in other examples, it may be implicit which DMRS port is orthogonal and which is SFNed. For example, the DMRS port with the lowest index may be SFNed while the DMRS port with the higher index may be orthogonal. In other examples, the DMRS port with the highest index may be SFNed while the DMRS port with the lower index may be orthogonal. Those examples may apply to a UE that has two or more DMRS ports.

Figure 5:
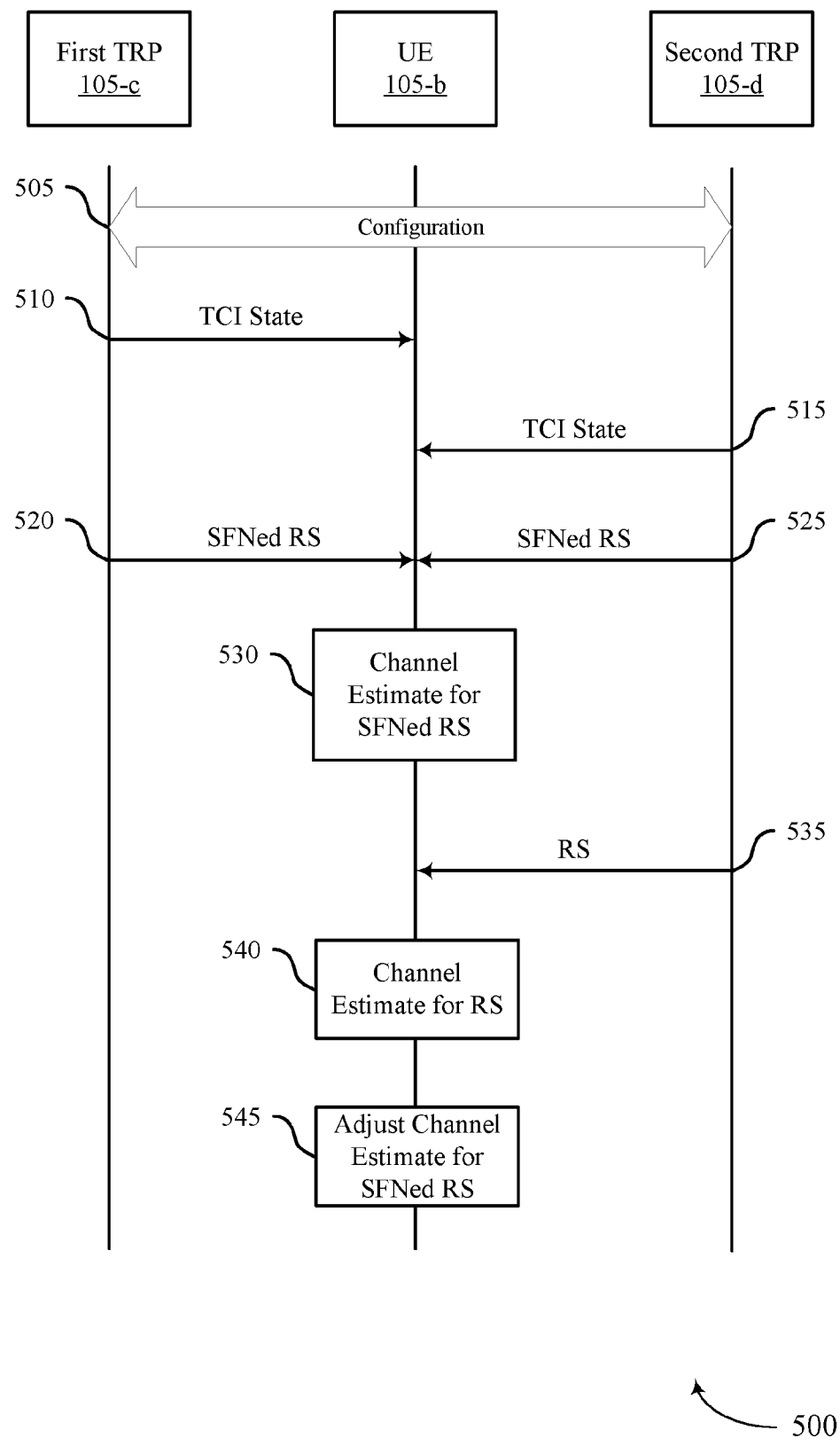
FIG. 5 illustrates an example of a process flow that supports design and consideration for demodulation reference signal and tracking reference signal quasi co-location relationships in accordance with aspects of the present disclosure.

FIG. 5 illustrates an example of a process flow 500 that supports design and consideration for demodulation reference signal and tracking reference signal quasi co-location relationships in accordance with aspects of the present disclosure. Process flow 500 may describe aspects related to a first TRP 105-*c* and a second TRP 105-*d* (collectively referred to herein as TRPs 105), and a UE 115-*b*. In some examples, the TRPs 105 and the UE 115-*b* may represent one or more aspects of the base stations 105 and the UEs 115 shown in FIG. 1, respectively.

At 505, the first TRP 105-*c* may perform any necessary configuration with the second TRP 105-*d*. For example, the TRPs 105 may need to the reference signal to be SFNed, the radio resources to use to transmit the reference signal (e.g., timing and frequency), and determine which, if any, of the TRPs 105 is going to transmit an independent reference signal. The TRPs 105 may also determine the TCI configuration and which TRP is going to configure the UE 105-*b*, if needed.

At 510, the first TRP 105-*c* may send TCI state information to the UE 105-*b*. The TCI state information may include whether there are one, two, or more TCI states. The TCI states may be sent in one or more downlink control information (DCI) messages. The DCI message may indicate two or more TCI states identifications. In some examples, the TCI states may include pair configuration information in the RRC configuration, which may specify which port is SFNed and which is not. In such an example, the ports may be implicitly ordered. Alternatively, the DCI may indicate the identification of the TCI state pair.

In another example, the DCI may indicate a DCI state index. One DCI state may have a list of TCI states. Alternatively, there may be two lists of TCI states. A first list may be SFNed and the second list may apply to examples where an independent reference signal is used (e.g., 3GPP Release 17). A correspondence may be set up between the lists such that having a NULL value for one of the lists implies a single SFN TRP transmission, which two non-NULL values implies that there are multiple SFN TRP transmissions and an independent reference signal may be used.

Alternatively or additionally, the second TRP 105-*d* may send TCI state information to the UE 105-*b* at 515.

At 520, the first TRP 105-*c* may transmit an SFNed RS to the UE 105-*b*. Concurrently, the second TRP 105-*d* may transmit its SFNed RS to the UE 105-*b* at 525. These signals may be transmitted once, periodically, or aperiodically. In some examples, the SFNed reference signals are transmitted periodically.

At 530, the UE 105-*b* may perform channel estimation for the SFNed reference signal (e.g., H1+H2).

At 535, the second TRP 105-*d* may transmit the independent reference signal to the UE 105-*b*. In some examples, the independent reference signal is transmitted concurrently with the SFNed reference signals. In other examples, the first TRP 105-*c* may be the TRP which sends the independent reference signal instead of the second TRP 105-*d*.

At 540, the UE 105-*b* may perform channel estimation for the independent reference signal (e.g., H1). In some examples, the UE 105-*b* performs the channel estimation for the independent reference signal before, or concurrently with, performing channel estimation for the SFNed reference signal.

At 545, the UE 105-*b* may adjust the channel estimate for the SFNed reference signal to determine the channel estimate for the radio channel between the UE 105-*b* and the first TRP 105-*c* (H2). The UE 105-*b* may determine the channel estimate between the UE 105-*b* and the first TRP 105-*c* by subtracting the channel estimate between the UE 105-*c* and the first TRP 105-*c* from the channel estimate for the SFNed reference signal. In other examples, the UE may perform the channel estimate adjustment in a different way.

In some examples, more than two TRPs 105 may be used. In such an example for multiple TRPs, one or more ports are SFNed while the rest are independent. In some examples, multiple TCI states may be equal to the number of TRPs. Similarly, multiple TRS ports may be equal to the number of TRPs. In a three TRP scenario (the three TRPs are called TRP0, TRP1, and TRP2 here), at least three options may be provided. In a first option, a TRS port0 is SFNed across all three TRPs, and a subset of two of the TRPs (e.g., TRS port 1, TRS port2) are independent. In a second option, pairs of two TRPs are SFNed together. For example, a TRS port0 could be SFNed for TRP0 and TRP2, a TRS port1 could be SFNed for TRP0 and TRP2, and a TRS port2 could be SFNed for TRP1 and TRP2. Other combinations may be used. In a third option, two ports could be SFNed while a third port is independent. For example, a TRS port0 could be SFNed between TRP0 and TRP1. A TRS port1 could be SFNed between TRP1 and TRP2. Meanwhile, TRP0 may be independent. Other combinations are contemplated.

Figure 6:
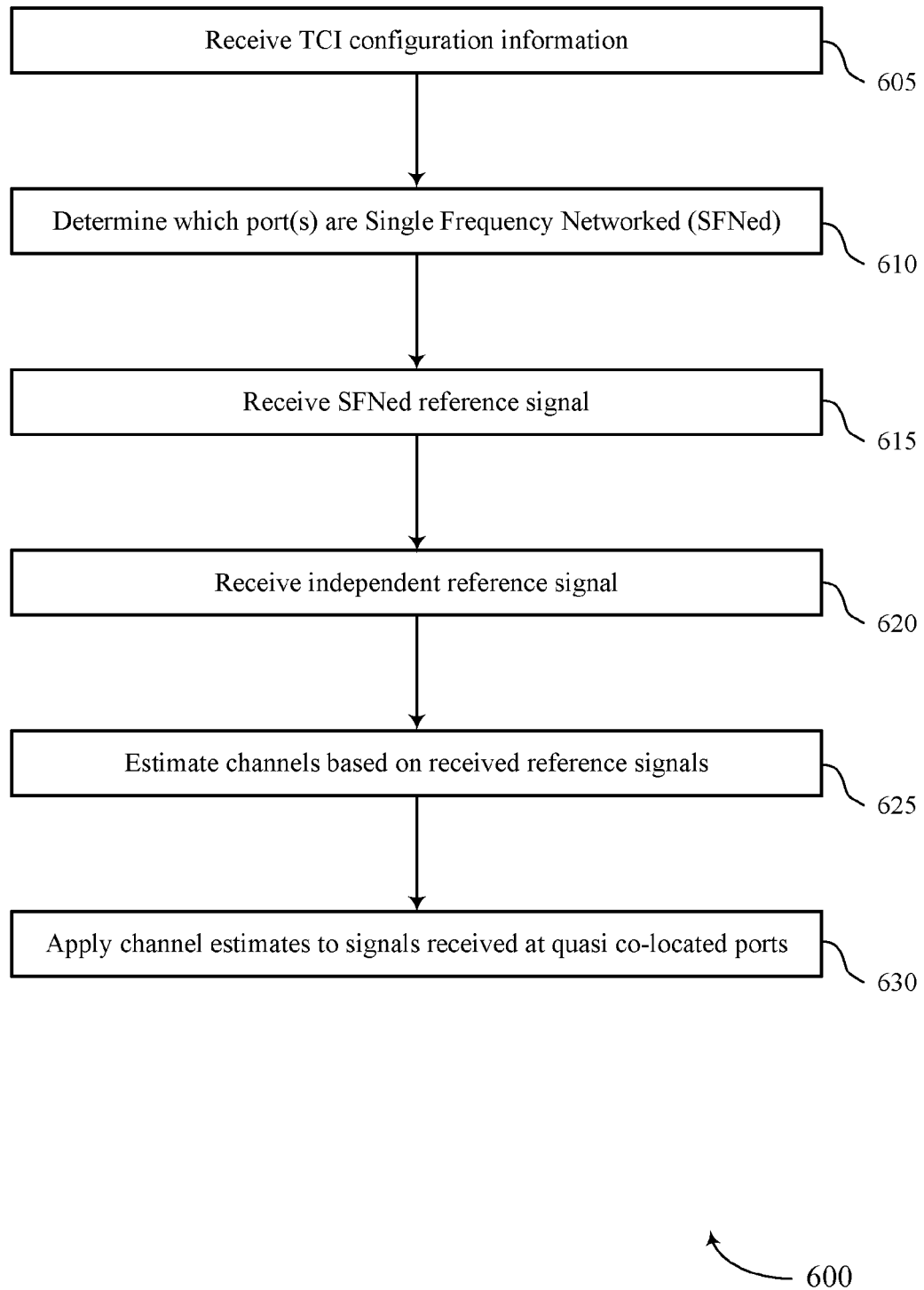
FIG. 6 illustrates an example of a of a method for a UE to perform channel estimation that supports design and consideration for demodulation reference signal and tracking reference signal quasi co-location relationships in accordance with aspects of the present disclosure.

FIG. 6 illustrates an example of a method 600 that supports design and consideration for demodulation reference signal and tracking reference signal quasi co-location relationships in accordance with aspects of the present disclosure. The method 600 may be performed by a UE, which may be a UE 115 as described in FIGS. 1, 2, and 5.

At 605, the UE may receive TCI configuration information that identifies the applicable TCI states. In some examples, the TCI configuration information may be in a DCI message or an RRC message. The TCI configuration information may indicate one or two TCI states, for example. At 610, the UE may determine which ports are SFNed. The UE may determine this using the TCI configuration information.

At 615, the UE may receive the SFNed reference signal. The SFNed reference signal may be a sum of two or more separate SFNed reference signal transmissions. At 620, the UE may receive independent reference signals. The signals at 615 and 620 may be received concurrently. In some examples, the signals at 615 are received periodically. In some examples, the signal at 620 is received periodically or aperiodically.

At 625, the UE may perform channel estimations based on the received reference signals. The channel estimation may be performed as described herein. At 630, the UE may apply the channel estimations to signals received at the QCL ports. For example, the UE may apply the channel estimations to data transmissions received at the UE.

Figure 7:
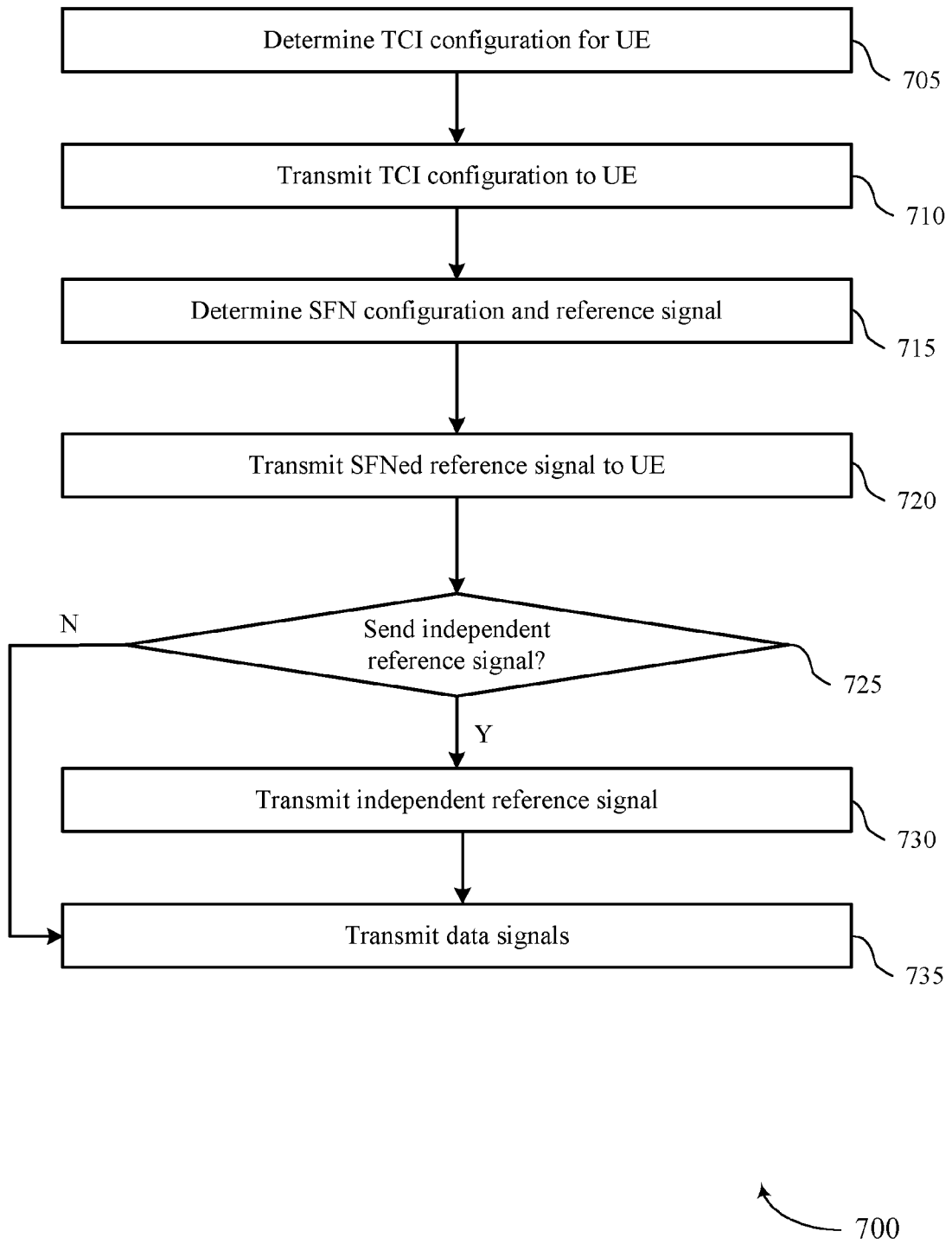
FIG. 7 illustrates an example of a method for a TRP to provide reference signals to a UE that supports design and consideration for demodulation reference signal and tracking reference signal quasi co-location relationships in accordance with aspects of the present disclosure.

FIG. 7 illustrates an example of a method 700 that supports design and consideration for demodulation reference signal and tracking reference signal quasi co-location relationships in accordance with aspects of the present disclosure. The method 700 may be performed by a base station, which may be a base station 105 as described in FIGS. 1, 2, and 5.

At 705, the base station may determine TCI configuration information that identifies the applicable TCI states for the UE. The base station may transmit the TCI configuration information in a DCI message or an RRC message at 710. The TCI configuration information may indicate one or two TCI states, for example. At 715, the base station may determine SF configuration and details about any reference signals to be SFNed (e.g., the TRP may determine which ports are SFNed with another TRP). In some examples, determining the SF configuration may precede determining the TCI configuration or transmitting the TCI configuration.

At 720, the base station may transmit the SFNed reference signal to the UE. At 725, the base station may determine whether it is to transmit an independent reference signal to the UE. If so, the method 700 proceeds to transmitting the independent reference signal at 730. The transmissions may happen concurrently. If the base station is not to transmit an independent reference signal, the method 700 proceeds to 735, and the base station transmits data signals. In some examples, 720, 725, 730, and 735 may happen periodically or aperiodically.

Figure 8:
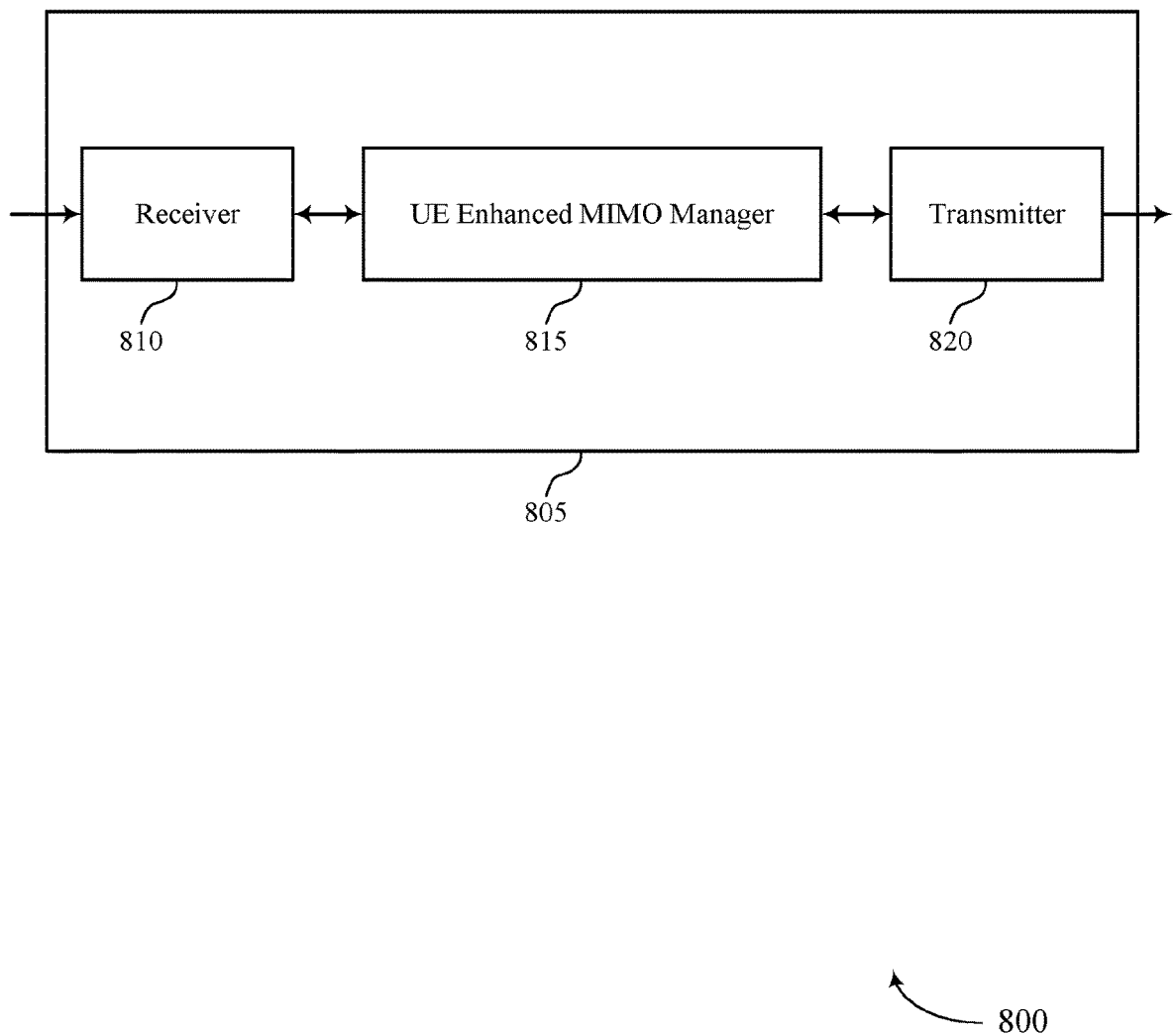
FIGS. 8 and 9 show block diagrams of devices that support design and consideration for demodulation reference signal and tracking reference signal quasi co-location relationships in accordance with aspects of the present disclosure.

FIG. 8 shows a block diagram 800 of a device 805 that supports design and consideration for demodulation reference signal and tracking reference signal quasi co-location relationships in accordance with aspects of the present disclosure. The device 805 may be an example of aspects of a UE 115 as described herein. The device 805 may include a receiver 810, a UE enhanced MIMO manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to design and consideration for demodulation reference signal and tracking reference signal quasi co-location relationships, etc.). Information may be passed on to other components of the device 805. The receiver 810 may be an example of aspects of the transceiver 1120 described with reference to FIG. 11. The receiver 810 may utilize a single antenna or a set of antennas.

The UE enhanced MIMO manager 815 may receive, via the receiver 810, a single frequency networked composite reference signal at a first port of a UE single frequency networked composite reference signal. The UE enhanced MIMO manager 815 may also receive, via the receiver 810, a reference signal at a second port of the UE that is different than the first port of the UE. The UE enhanced MIMO manager may also perform channel estimation for at least one of the first port or the second port based on receiving the single frequency networked composite reference signal and the reference signal. The UE enhanced MIMO manager 815 may be an example of aspects of the UE enhanced MIMO manager 1110 described herein.

The UE enhanced MIMO manager 815, or its sub-components, may be implemented in hardware, code (e.g., software or firmware) executed by a processor, or any combination thereof. If implemented in code executed by a processor, the functions of the UE enhanced MIMO manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE enhanced MIMO manager 815, or its sub-components, may be physically located at various positions, including being distributed such that portions of functions are implemented at different physical locations by one or more physical components. In some examples, the UE enhanced MIMO manager 815, or its sub-components, may be a separate and distinct component in accordance with various aspects of the present disclosure. In some examples, the UE enhanced MIMO manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
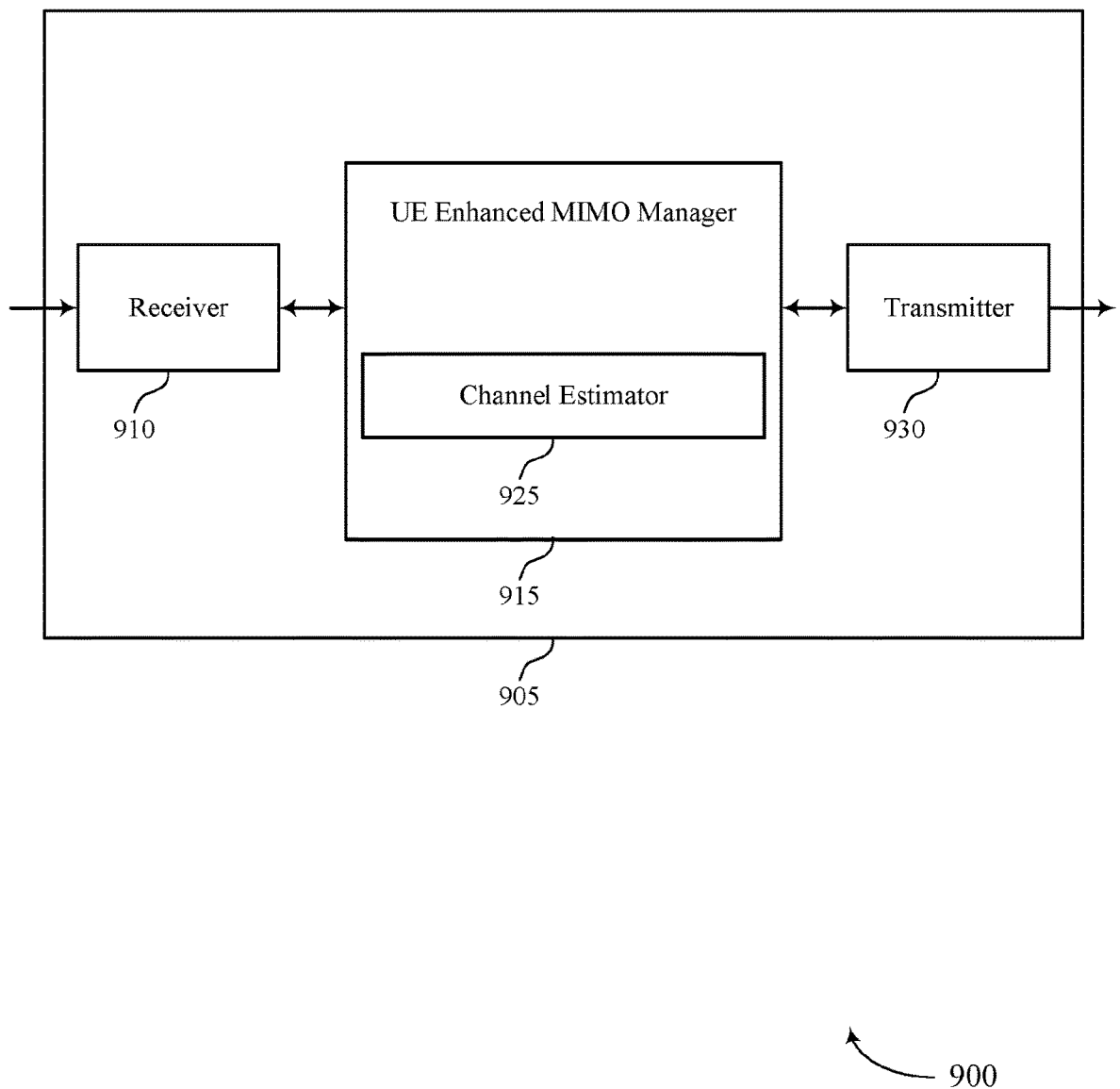

FIG. 9 shows a block diagram 900 of a device 905 that supports design and consideration for demodulation reference signal and tracking reference signal quasi co-location relationships in accordance with aspects of the present disclosure. The device 905 may be an example of aspects of a device 805, or a UE 115 as described herein. The device 905 may include a receiver 910, a UE enhanced MIMO manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to design and consideration for demodulation reference signal and tracking reference signal quasi co-location relationships, etc.). Information may be passed on to other components of the device 905. The receiver 910 may be an example of aspects of the transceiver 1120 described with reference to FIG. 11. The receiver 910 may utilize a single antenna or a set of antennas.

The UE enhanced MIMO manager 915 may be an example of aspects of the UE enhanced MIMO manager 815 as described herein. The UE enhanced MIMO manager 915 may include a channel estimator 925. The UE enhanced MIMO manager 915 may be an example of aspects of the enhanced MIMO manager 1110 described herein.

The receiver 920 may receive a single frequency networked composite reference signal at a first port of a UE single frequency networked composite reference signal. The receiver 920 may also receive a reference signal at a second port of the UE that is different than the first port of the UE.

The channel estimator 925 may perform channel estimation for at least one of the first port or the second port based on receiving the single frequency networked composite reference signal and the reference signal.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
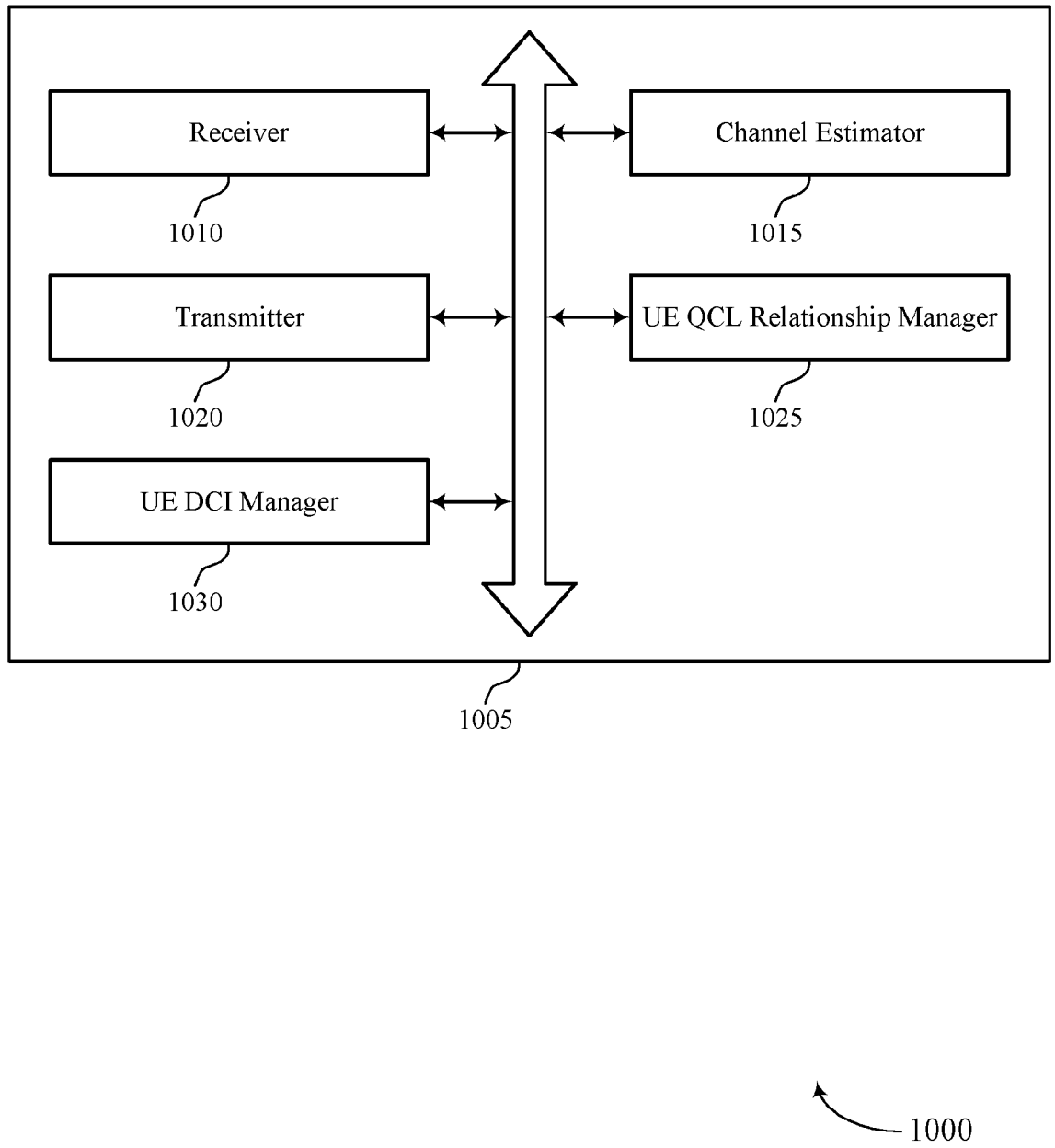
FIG. 10 shows a block diagram of an enhanced MIMO manager that supports design and consideration for demodulation reference signal and tracking reference signal quasi co-location relationships in accordance with aspects of the present disclosure.

FIG. 10 shows a block diagram 1000 of a UE enhanced MIMO manager 1005 that supports design and consideration for demodulation reference signal and tracking reference signal quasi co-location relationships in accordance with aspects of the present disclosure. The UE enhanced MIMO manager 1005 may be an example of aspects of a UE enhanced MIMO manager 815, a UE enhanced MIMO manager 915, or an UE enhanced MIMO manager 1110 described herein. The UE enhanced MIMO manager 1005 may include a receiver 1010, a channel estimator 1015, a transmitter 1020, a UE QCL relationship manager 1025, and a UE DCI manager 1030. Each of these modules may communicate, directly or indirectly, with one another (e.g., via one or more buses).

The receiver 1010 may receive a single frequency networked composite reference signal at a first port of a UE single frequency networked composite reference signal. In some examples, the receiver 1010 may receive a reference signal at a second port of the UE that is different than the first port of the UE. In some examples, receiving the single frequency networked composite reference signal includes receiving the single frequency networked composite reference signal from a first transmit/reception point and a second transmit/reception point, and where receiving the reference signal includes receiving the reference signal from the first transmit/reception point, or the second transmit/reception point. In some examples, receiving the reference signal may also include receiving the reference signal from a third transmit/reception point.

In some examples, the receiver 1010 may receive a first reference signal from a first transmit/reception point at a first frequency resource. In some examples, the receiver 1010 may receive a second reference signal from a second transmit/reception point at the first frequency resource, where the first reference signal and the second reference signal include the same information. In some examples, the receiver 1010 may periodically receive an additional single frequency networked composite reference signal at the first port of the UE, where performing the channel estimation is based on periodically receiving the additional single frequency networked composite reference signal.

In some examples, the receiver 1010 may periodically receive at least one additional reference signal at the second port of the UE, where performing the channel estimation is based on periodically receiving the at least one additional reference signal. In some examples, the receiver 1010 may aperiodically receive at least one additional reference signal at the second port of the UE, where performing the channel estimation is based on periodically receiving the at least one additional reference signal.

In some examples, the receiver 1010 may receive a downlink control information message that indicates at least one transmission configuration indicator state that identifies which port of a set of ports at the UE receives the single frequency networked composite reference signal, where receiving the single frequency networked composite reference signal at the first port of the UE is based on receiving the downlink control information message.

In some cases, the single frequency networked composite reference signal and the reference signal are tracking reference signals or demodulation reference signals. In some cases, a subset of the single frequency networked composite reference signal may be transmitted from multiple transmit/reception points of a set of transmit/reception points.

The UE channel estimator 1015 may perform channel estimation for at least one of the first port or the second port based on receiving the single frequency networked composite reference signal and the reference signal. In some examples, the UE channel estimator 1015 may determine a first channel condition parameter associated with the second port based on the reference signal. In some examples, the UE channel estimator 1015 may determine a second channel condition parameter associated with the first port based on the single frequency networked composite reference signal and the first channel condition parameter. In some examples, the UE channel estimator 1015 may determine a first instance of the second channel condition parameter based on the single frequency networked composite reference signal. In some examples, subtracting a first instance of the first channel condition parameter from the first instance of the second channel condition parameter to determine a second instance of the second channel condition parameter, where the second instance of the second channel condition parameter includes the second channel condition parameter.

In some cases, the first channel condition parameter or the second channel condition parameter may include a Doppler shift parameter, a Doppler spread parameter, an average delay parameter, a delay spread parameter, or a spatial receiver parameter, or any combination thereof. In some cases, the single frequency networked composite reference signal and the reference signal are associated with a physical downlink shared channel or a physical downlink control channel.

The transmitter 1020 may transmit, in a radio resource control message, an indication of a compatibility of the UE with one or more constraints, where receiving the single frequency networked composite reference signal is based on transmitting the indication of the compatibility of the UE.

The UE QCL relationship manager 1025 may determine a first quasi co-location relationship between the first port and a demodulation reference signal port at the UE, where performing the channel estimation is based on determining the first quasi co-location relationship. In some examples, the UE QCL relationship manager 1025 may determine a second quasi co-location relationship between the second port and a second demodulation reference signal port at the UE, where performing the channel estimation is based on determining the second quasi co-location relationship.

The UE DCI manager 1030 may receive a downlink control information message indicating at least one transmission configuration indicator state identifier, where performing the channel estimation is based on receiving the downlink control information message. In some examples, the UE DCI manager 1030 may determine that the first port has a lower port index than the second port. In some examples, the UE DCI manager 1030 may determine whether a demodulation reference signal port is orthogonal or single frequency networked based on determining that the first port has the lower port index than the second port, where performing the channel estimation is based on determining whether the demodulation reference signal port is orthogonal or single frequency networked.

In some cases, the downlink control information message further indicates at least a second transmission configuration indicator state identifier, where performing the channel estimation is based on receiving the downlink control information message. In some cases, the at least one transmission configuration indicator state identifier indicates at least one transmission configuration indicator state pair. In some cases, the at least one transmission configuration indicator state identifier indicates at least one list of transmission configuration indicator states.

Figure 11:
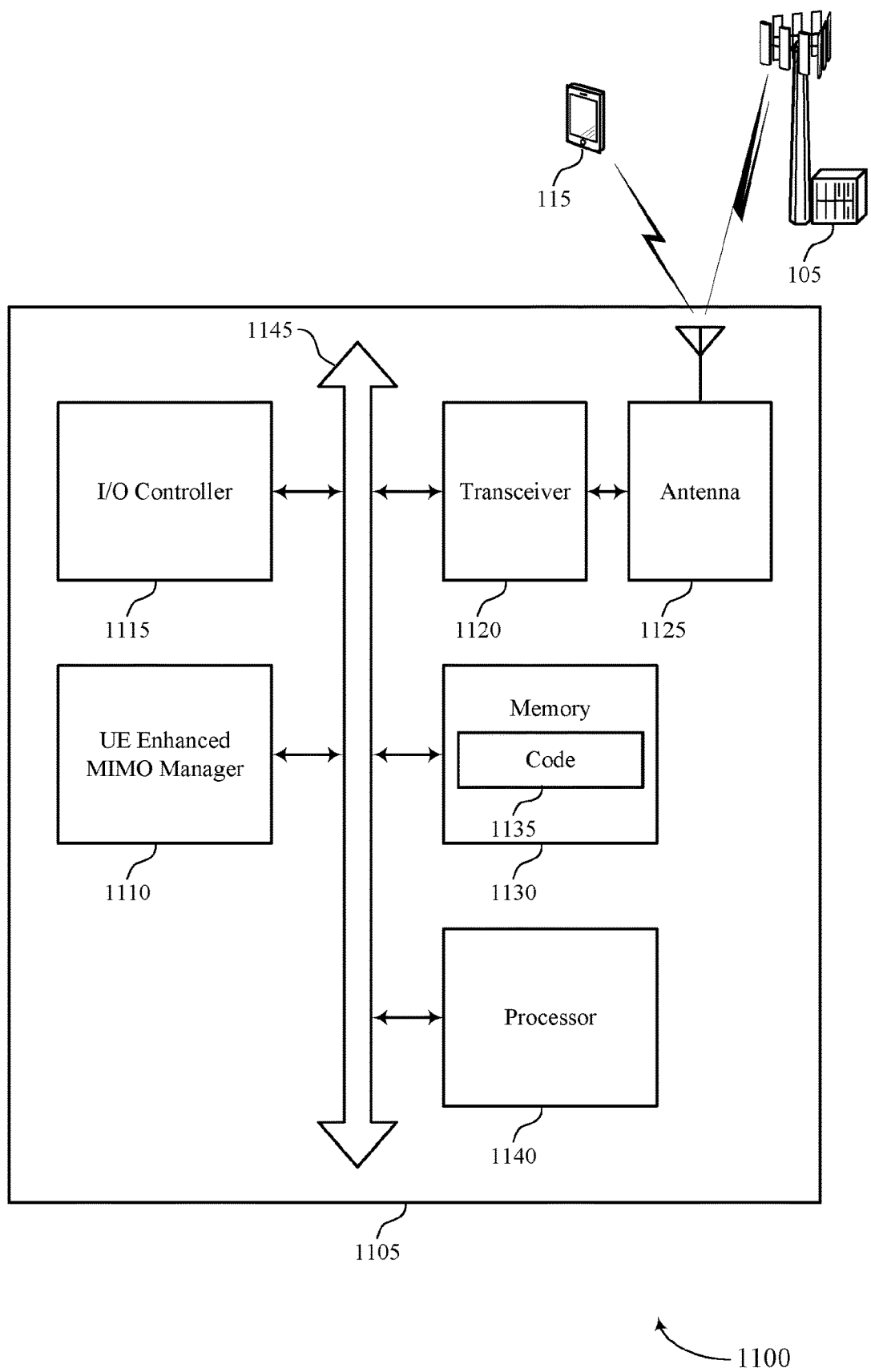
FIG. 11 shows a diagram of a system including a device that supports design and consideration for demodulation reference signal and tracking reference signal quasi co-location relationships in accordance with aspects of the present disclosure.

FIG. 11 shows a diagram of a system 1100 including a device 1105 that supports design and consideration for demodulation reference signal and tracking reference signal quasi co-location relationships in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE enhanced MIMO manager 1110, an I/O controller 1115, a transceiver 1120, an antenna 1125, memory 1130, and a processor 1140. These components may be in electronic communication via one or more buses (e.g., bus 1145).

The UE enhanced MIMO manager 1110 may receive, via the transceiver 1120, a single frequency networked composite reference signal at a first port of a UE single frequency networked composite reference signal. The UE enhanced MIMO manager 1110 may receive, via the transceiver 1120, a reference signal at a second port of the UE that is different than the first port of the UE, and perform channel estimation for at least one of the first port or the second port based on receiving the single frequency networked composite reference signal and the reference signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting design and consideration for demodulation reference signal and tracking reference signal quasi co-location relationships).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
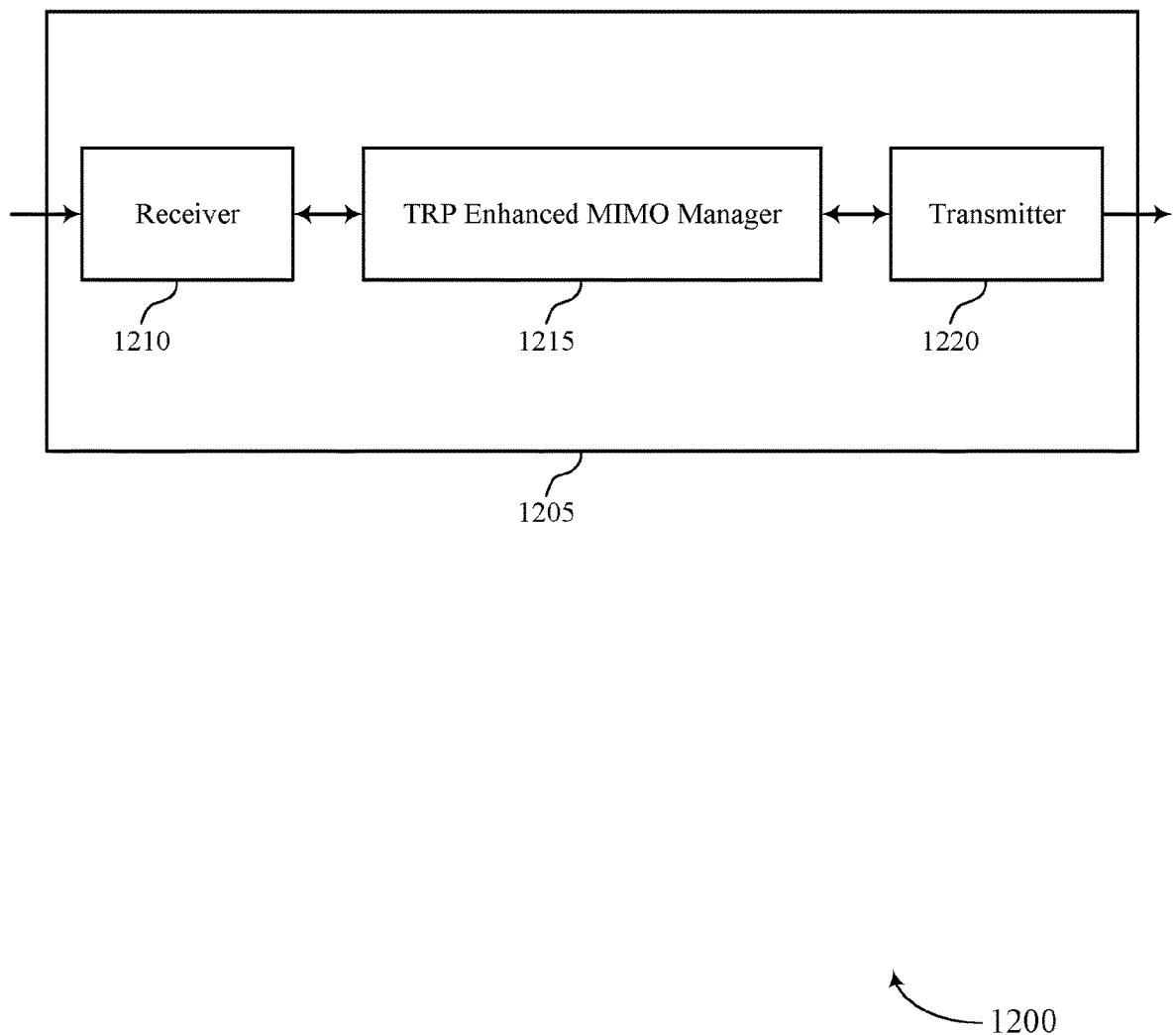
FIGS. 12 and 13 show block diagrams of devices that support design and consideration for demodulation reference signal and tracking reference signal quasi co-location relationships in accordance with aspects of the present disclosure.

FIG. 12 shows a block diagram 1200 of a device 1205 that supports design and consideration for demodulation reference signal and tracking reference signal quasi co-location relationships in accordance with aspects of the present disclosure. The device 1205 may be an example of aspects of a base station 105 as described herein. The device 1205 may include a receiver 1210, a TRP enhanced MIMO manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to design and consideration for demodulation reference signal and tracking reference signal quasi co-location relationships, etc.). Information may be passed on to other components of the device 1205. The receiver 1210 may be an example of aspects of the transceiver 1520 described with reference to FIG. 15. The receiver 1210 may utilize a single antenna or a set of antennas.

The TRP enhanced MIMO manager 1215 may transmit a first portion of a single frequency networked composite reference signal from a first port of a first transmit/reception point to a UE. The TRP enhanced MIMO manager 1215 may transmit a downlink control information message to the UE that indicates at least one transmission configuration indicator state identifier including information to identify the single frequency networked composite reference signal. The TRP enhanced MIMO manager 1215 may be an example of aspects of the TRP enhanced MIMO manager 1510 described herein.

The TRP enhanced MIMO manager 1215, or its sub-components, may be implemented in hardware, code (e.g., software or firmware) executed by a processor, or any combination thereof. If implemented in code executed by a processor, the functions of the TRP enhanced MIMO manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The TRP enhanced MIMO manager 1215, or its sub-components, may be physically located at various positions, including being distributed such that portions of functions are implemented at different physical locations by one or more physical components. In some examples, the TRP enhanced MIMO manager 1215, or its sub-components, may be a separate and distinct component in accordance with various aspects of the present disclosure. In some examples, the TRP enhanced MIMO manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
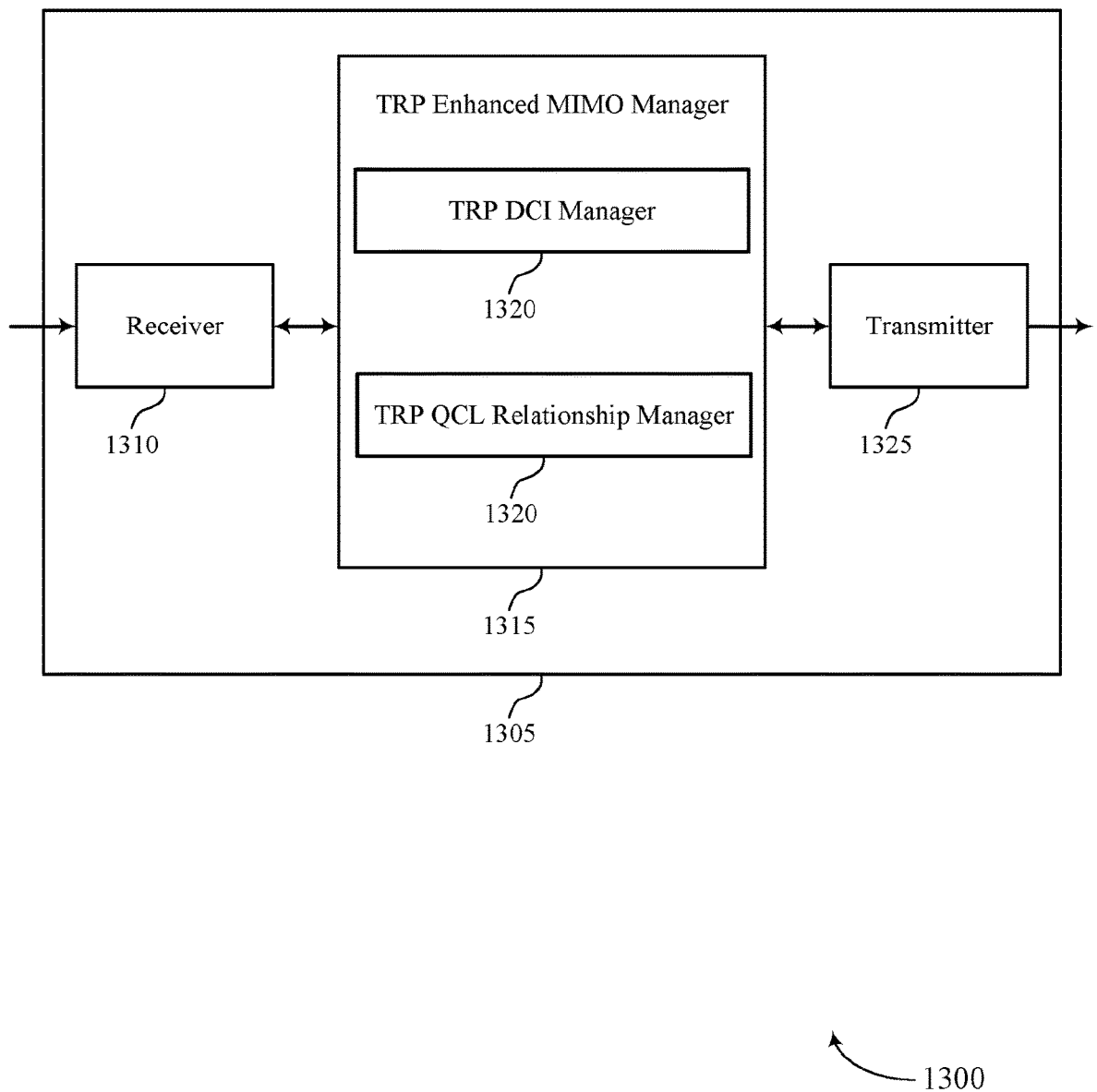

FIG. 13 shows a block diagram 1300 of a device 1305 that supports design and consideration for demodulation reference signal and tracking reference signal quasi co-location relationships in accordance with aspects of the present disclosure. The device 1305 may be an example of aspects of a device 1205, or a base station 105 as described herein. The device 1305 may include a receiver 1310, a TRP enhanced MIMO manager 1315, and a transmitter 1325. The device 1305 may also include a processor. Each of these components may be in communication with one another (e.g., via one or more buses).

The receiver 1310 may receive information such as packets, user data, or control information associated with various information channels (e.g., control channels, data channels, and information related to design and consideration for demodulation reference signal and tracking reference signal quasi co-location relationships, etc.). Information may be passed on to other components of the device 1305. The receiver 1310 may be an example of aspects of the transceiver 1520 described with reference to FIG. 15. The receiver 1310 may utilize a single antenna or a set of antennas.

The TRP enhanced MIMO manager 1315 may be an example of aspects of the TRP enhanced MIMO manager 1215 as described herein. The TRP enhanced MIMO manager 1315 may include a transmitter 1320. The TRP enhanced MIMO manager 1315 may be an example of aspects of the TRP enhanced MIMO manager 1510 described herein.

The transmitter 1320 may transmit a first portion of a single frequency networked composite reference signal from a first port of a first transmit/reception point to a UE and transmit a downlink control information message to the UE that indicates at least one transmission configuration indicator state identifier including information to identify the single frequency networked composite reference signal.

The transmitter 1325 may transmit signals generated by other components of the device 1305. In some examples, the transmitter 1325 may be collocated with a receiver 1310 in a transceiver module. For example, the transmitter 1325 may be an example of aspects of the transceiver 1520 described with reference to FIG. 15. The transmitter 1325 may utilize a single antenna or a set of antennas.

Figure 14:
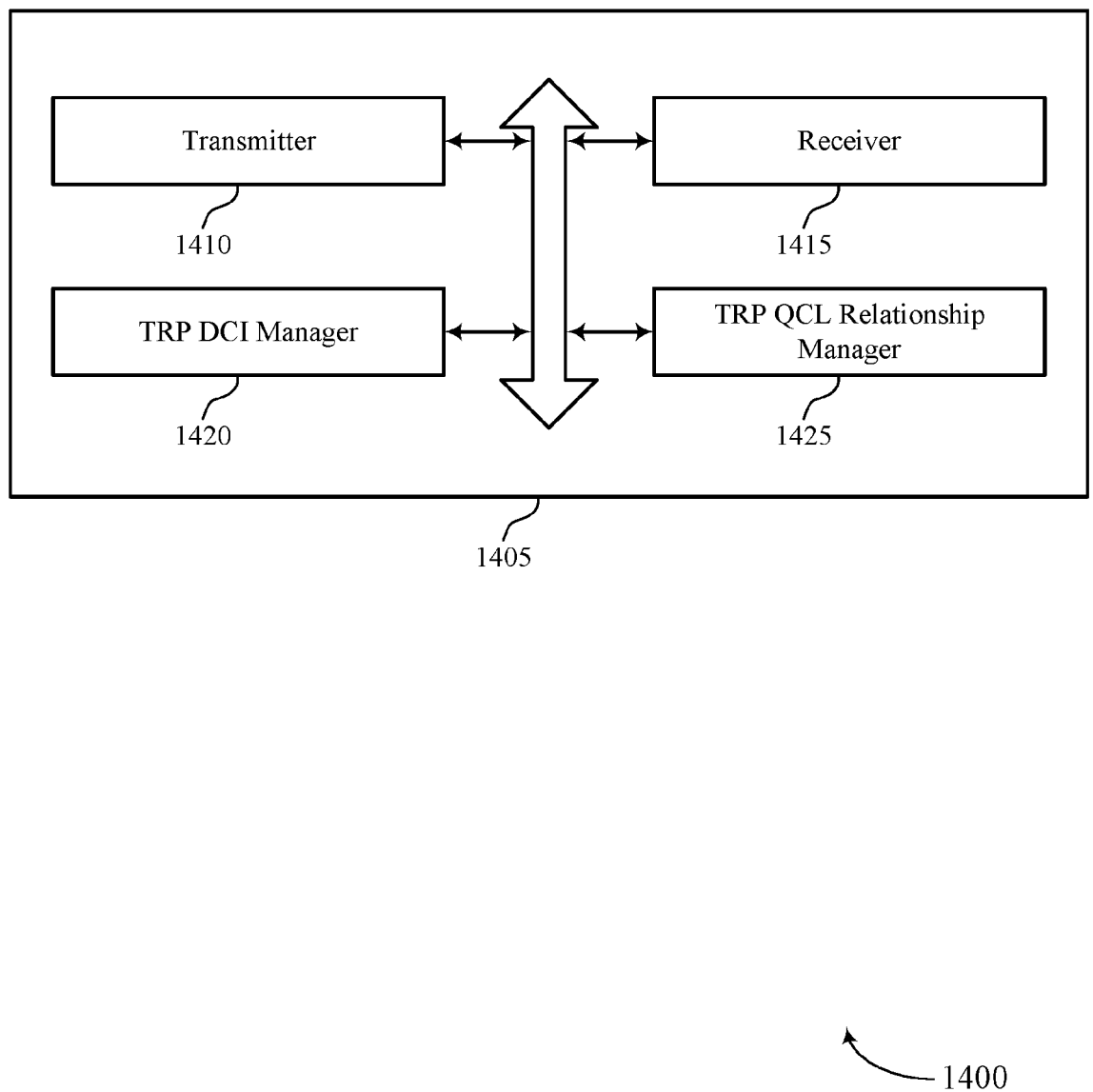
FIG. 14 shows a block diagram of an enhanced MIMO manager that supports design and consideration for demodulation reference signal and tracking reference signal quasi co-location relationships in accordance with aspects of the present disclosure.

FIG. 14 shows a block diagram 1400 of a TRP enhanced MIMO manager 1405 that supports design and consideration for demodulation reference signal and tracking reference signal quasi co-location relationships in accordance with aspects of the present disclosure. The enhanced MIMO manager 1405 may be an example of aspects of an TRP enhanced MIMO manager 1215, an TRP enhanced MIMO manager 1315, or an TRP enhanced MIMO manager 1510 described herein. The TRP enhanced MIMO manager 1405 may include a transmitter 1410, a receiver 1415, a DCI manager 1420, and a QCL relationship manager 1425. Each of these modules may communicate, directly or indirectly, with one another (e.g., via one or more buses).

The transmitter 1410 may transmit a first portion of a single frequency networked composite reference signal from a first port of a first transmit/reception point to a UE. In some examples, the transmitter 1410 may transmit a downlink control information message to the UE that indicates at least one transmission configuration indicator state identifier including information to identify the single frequency networked composite reference signal. In some examples, the transmitter 1410 may transmit a reference signal from a second port of the first transmit/reception point to the UE, where the second port is different than the first port.

In some examples, the transmitter 1410 may periodically transmit additional reference signals at the second port to the UE, where transmitting the reference signal is based on periodically transmitting the additional reference signals. In some examples, the transmitter 1410 may aperiodically transmit additional reference signals at the second port to the UE, where transmitting the reference signal is based on aperiodically transmitting the additional reference signals.

In some examples, the transmitter 1410 may transmit the first portion of the single frequency networked composite reference signal at a same frequency as a first port of a second transmit/reception point that transmits a second portion of the single frequency networked composite reference signal on the same frequency. In some examples, transmitting the downlink control information message includes transmitting the downlink control information message that indicates at least a second transmission configuration indicator state identifier.

In some examples, the transmitter 1410 may periodically transmit additional first portions of single frequency networked composite reference signals to the UE, where transmitting the first portion of the single frequency networked composite reference signal is based on periodically transmitting the additional first portions of the single frequency networked composite reference signals. In some cases, the single frequency networked composite reference signal is a tracking reference signal or a demodulation reference signal. In some cases, the single frequency networked composite reference signal is associated with a physical downlink shared channel or a physical downlink control channel.

The receiver 1415 may receive, from the UE, an indication of a compatibility of the UE.

The TRP DCI manager 1420 may determine the compatibility of the UE, where transmitting the first portion of the single frequency networked composite reference signal is based on whether the compatibility of the UE indicates a first compatibility or a second compatibility, and where transmitting the reference signal is based on whether the compatibility of the UE indicates the second compatibility.

In some examples, the TRP DCI manager 1420 may receive an indication of the compatibility of the UE in a radio resource control message. In some cases, the at least one transmission configuration indicator state identifier indicates a transmission configuration indicator state pair. In some cases, the at least one transmission configuration indicator state identifier indicates at least one list of transmission configuration indicator states.

The TRP QCL relationship manager 1425 may determine a first quasi co-location relationship between the first port at the first transmit/reception point and a second port at a second transmit/reception point that transmits a second portion of the single frequency networked composite reference signal, where transmitting the first portion of the single frequency networked composite reference signal is based on determining the first quasi co-location relationship. In some cases, the at least one transmission configuration indicator state identifier identifies which port of a set of ports at the UE is for receiving the single frequency networked composite reference signal.

Figure 15:
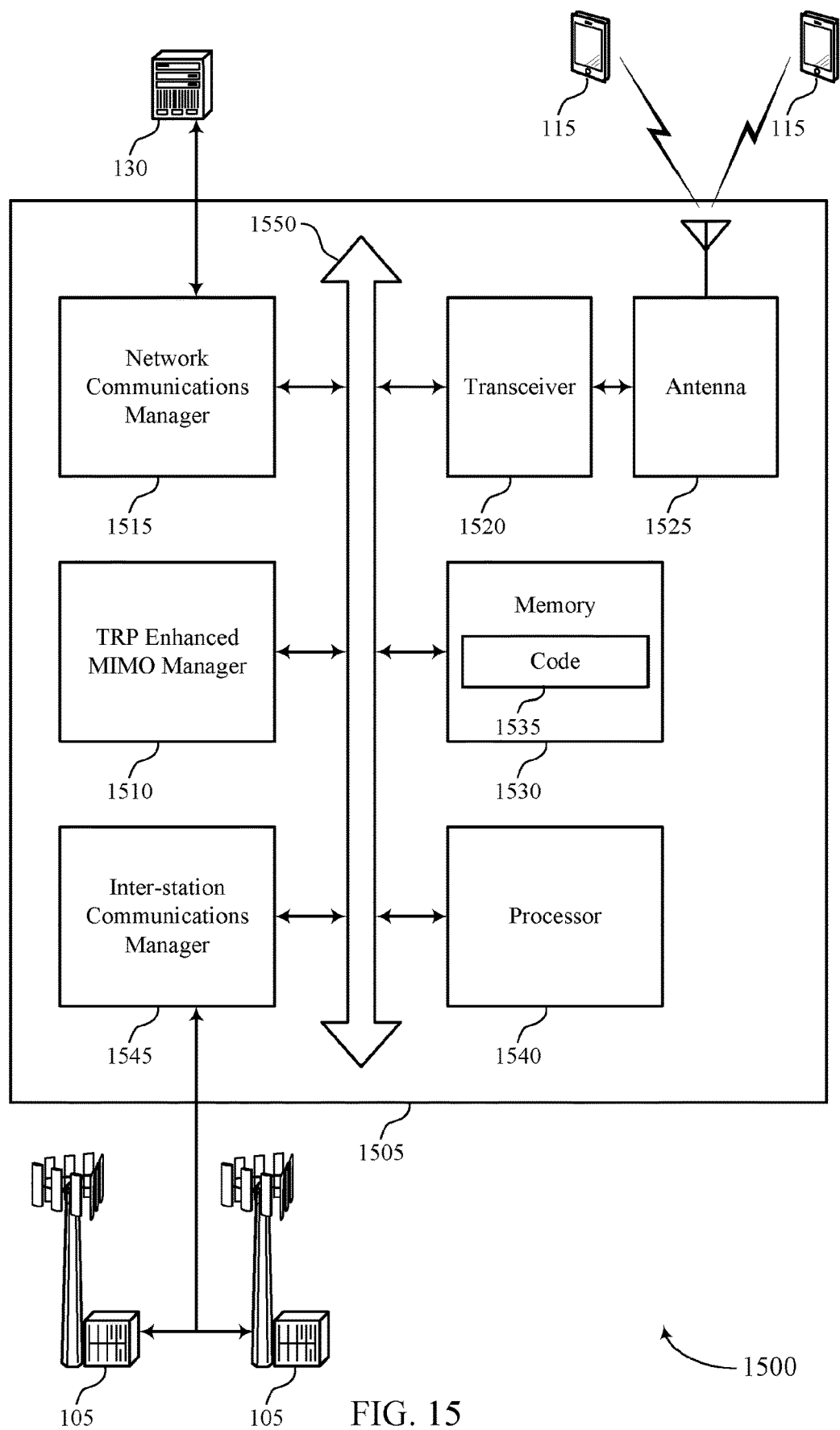
FIG. 15 shows a diagram of a system including a device that supports design and consideration for demodulation reference signal and tracking reference signal quasi co-location relationships in accordance with aspects of the present disclosure.

FIG. 15 shows a diagram of a system 1500 including a device 1505 that supports design and consideration for demodulation reference signal and tracking reference signal quasi co-location relationships in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a TRP enhanced MIMO manager 1510, a network communications manager 1515, a transceiver 1520, an antenna 1525, memory 1530, a processor 1540, and an inter-station communications manager 1545. These components may be in electronic communication via one or more buses (e.g., bus 1550).

The TRP enhanced MIMO manager 1510 may transmit a first portion of a single frequency networked composite reference signal from a first port of a first transmit/reception point to a UE and transmit a downlink control information message to the UE that indicates at least one transmission configuration indicator state identifier including information to identify the single frequency networked composite reference signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting design and consideration for demodulation reference signal and tracking reference signal quasi co-location relationships).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
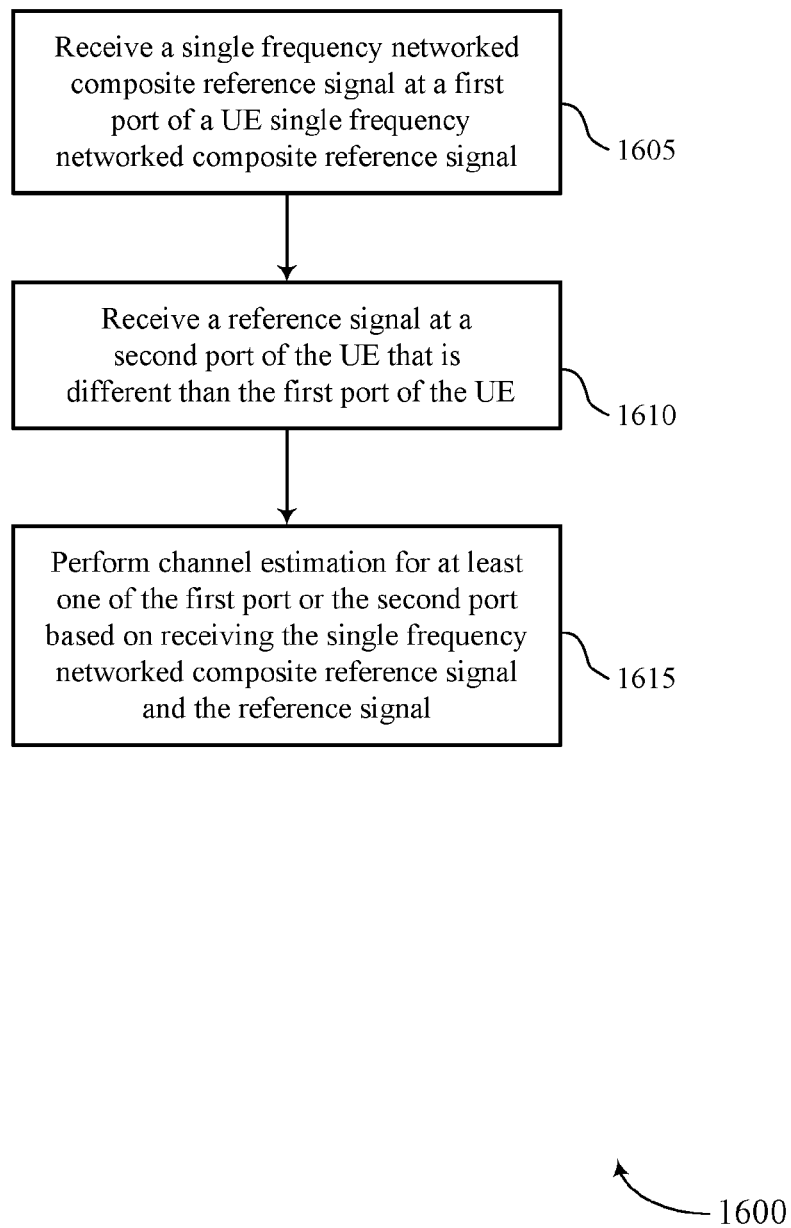
FIGS. 16 and 17 show flowcharts illustrating methods that support design and consideration for demodulation reference signal and tracking reference signal quasi co-location relationships in accordance with aspects of the present disclosure.

FIG. 16 shows a flowchart illustrating a method 1600 that supports design and consideration for demodulation reference signal and tracking reference signal quasi co-location relationships in accordance with aspects of the present disclosure. The operations of method 1600 may be implemented by a UE 115 or its components as described herein. For example, the operations of method 1600 may be performed by an enhanced MIMO manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a single frequency networked composite reference signal at a first port of a UE single frequency networked composite reference signal. The operations of 1605 may be performed according to the methods described herein. In some examples, aspects of the operations of 1605 may be performed by a receiver as described with reference to FIGS. 8 through 11. In some examples, receiving the single frequency networked composite reference signal further includes receiving the single frequency networked composite reference signal from a first transmit/reception point and a second transmit/reception point, and wherein receiving the reference signal from the first transmit/reception point, or the second transmit/reception point, or a third transmit/reception point.

In some examples, receiving the single frequency networked composite reference signal further includes receiving a first reference signal from a first transmit/reception point at a first frequency resource and receiving a second reference signal from a second transmit/reception point at the first frequency resource, wherein the first reference signal and the second reference signal comprise the same information.

At 1610, the UE may receive a reference signal at a second port of the UE that is different than the first port of the UE. The operations of 1610 may be performed according to the methods described herein. In some examples, aspects of the operations of 1610 may be performed by a receiver as described with reference to FIGS. 8 through 11.

At 1615, the UE may perform channel estimation for at least one of the first port or the second port based on receiving the single frequency networked composite reference signal and the reference signal. The operations of 1615 may be performed according to the methods described herein. In some examples, aspects of the operations of 1615 may be performed by a channel estimator as described with reference to FIGS. 8 through 11.

In some examples, performing the channel estimation further includes determining a first channel condition parameter associated with the second port based at least in part on the reference signal and determining a second channel condition parameter associated with the first port based at least in part on the single frequency networked composite reference signal and the first channel condition parameter. In some examples, determining the second channel condition parameter further includes determining a first instance of the second channel condition parameter based at least in part on the single frequency networked composite reference signal, and subtracting a first instance of the first channel condition parameter from the first instance of the second channel condition parameter to determine a second instance of the second channel condition parameter, wherein the second instance of the second channel condition parameter comprises the second channel condition parameter. The first channel condition parameter or the second channel condition parameter may comprise a Doppler shift parameter, a Doppler spread parameter, an average delay parameter, a delay spread parameter, or a spatial receiver parameter, or any combination thereof In some examples, the method 1600 includes transmitting, in a radio resource control message, an indication of a compatibility of the UE with one or more constraints, wherein receiving the single frequency networked composite reference signal is based at least in part on transmitting the indication of the compatibility of the UE. The method 1600 may further include determining a first quasi co-location relationship between the first port and a demodulation reference signal port at the UE, wherein performing the channel estimation is based at least in part on determining the first quasi co-location relationship. In other examples, the method 1600 also includes determining a second quasi co-location relationship between the second port and a second demodulation reference signal port at the UE, wherein performing the channel estimation is based at least in part on determining the second quasi co-location relationship.

In some examples, the method 1600 may also include receiving a downlink control information message indicating at least one transmission configuration indicator state identifier, wherein performing the channel estimation is based at least in part on receiving the downlink control information message. The downlink control information message may further indicate at least a second transmission configuration indicator state identifier, wherein performing the channel estimation is based at least in part on receiving the downlink control information message. In some examples, the at least one transmission configuration indicator state identifier indicates at least one transmission configuration indicator state pair. In other examples, the at least one transmission configuration indicator state identifier indicates at least one list of transmission configuration indicator states.

In some examples, the method 1600 further includes periodically receiving an additional single frequency networked composite reference signal at the first port of the UE, wherein performing the channel estimation is based at least in part on periodically receiving the additional single frequency networked composite reference signal. In some examples, the method 1600 further includes periodically receiving at least one additional reference signal at the second port of the UE, wherein performing the channel estimation is based at least in part on periodically receiving the at least one additional reference signal. In yet another example, the method 1600 includes aperiodically receiving at least one additional reference signal at the second port of the UE, wherein performing the channel estimation is based at least in part on periodically receiving the at least one additional reference signal.

In another example, the method 1600 may include determining that the first port has a lower port index than the second port, and determining whether a demodulation reference signal port is orthogonal or single frequency networked based at least in part on determining that the first port has the lower port index than the second port, wherein performing the channel estimation is based at least in part on determining whether the demodulation reference signal port is orthogonal or single frequency networked.

In another example, the method 1600 may include receiving a downlink control information message that indicates at least one transmission configuration indicator state that identifies which port of a plurality of ports at the UE receives the single frequency networked composite reference signal, wherein receiving the single frequency networked composite reference signal at the first port of the UE is based at least in part on receiving the downlink control information message.

In some examples, the single frequency networked composite reference signal and the reference signal are tracking reference signals or demodulation reference signals. In some examples, the single frequency networked composite reference signal and the reference signal are associated with a physical downlink shared channel or a physical downlink control channel. In another example, a subset of the single frequency networked composite reference signal may be transmitted from multiple transmit/reception points of a plurality of transmit/reception points.

Figure 17:
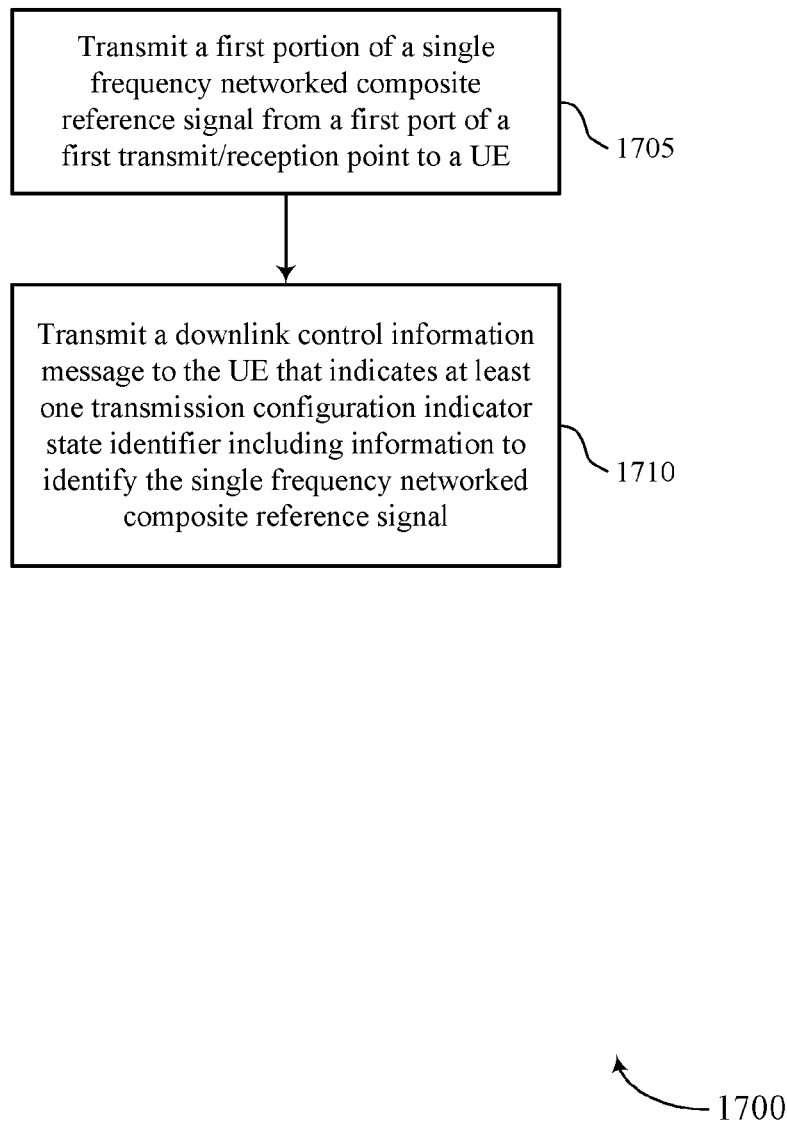

FIG. 17 shows a flowchart illustrating a method 1700 that supports design and consideration for demodulation reference signal and tracking reference signal quasi co-location relationships in accordance with aspects of the present disclosure. The operations of method 1700 may be implemented by a base station 105 or its components as described herein. For example, the operations of method 1700 may be performed by an enhanced MIMO manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may transmit a first portion of a single frequency networked composite reference signal from a first port of a first transmit/reception point to a UE. The operations of 1705 may be performed according to the methods described herein. In some examples, aspects of the operations of 1705 may be performed by a transmitter as described with reference to FIGS. 12 through 15. In some examples, transmitting the first portion of the single frequency networked composite reference signal from the first port further includes transmitting the first portion of the single frequency networked composite reference signal at a same frequency as a first port of a second transmit/reception point that transmits a second portion of the single frequency networked composite reference signal on the same frequency.

At 1710, the base station may transmit a downlink control information message to the UE that indicates at least one transmission configuration indicator state identifier including information to identify the single frequency networked composite reference signal. The operations of 1710 may be performed according to the methods described herein. In some examples, aspects of the operations of 1710 may be performed by a transmitter as described with reference to FIGS. 12 through 15. In some examples, transmitting the downlink control information message includes transmitting the downlink control information message that indicates at least a second transmission configuration indicator state identifier. In some examples, the at least one transmission configuration indicator state identifier indicates a transmission configuration indicator state pair. In some examples, the at least one transmission configuration indicator state identifier indicates at least one list of transmission configuration indicator states. In some examples, the at least one transmission configuration indicator state identifier identifies which port of a plurality of ports at the UE is for receiving the single frequency networked composite reference signal In some examples, the method 1700 may include transmitting a reference signal from a second port of the first transmit/reception point to the UE, wherein the second port is different than the first port. In some additional examples, the method 1700 further includes periodically transmitting additional reference signals at the second port to the UE, wherein transmitting the reference signal is based at least in part on periodically transmitting the additional reference signals. In other examples, the method 1700 further includes aperiodically transmitting additional reference signals at the second port to the UE, wherein transmitting the reference signal is based at least in part on aperiodically transmitting the additional reference signals.

In some examples, the method 1700 also includes receiving, from the UE, an indication of a compatibility of the UE, and determining the compatibility of the UE, wherein transmitting the first portion of the single frequency networked composite reference signal is based at least in part on whether the compatibility of the UE indicates a first compatibility or a second compatibility, and wherein transmitting the reference signal is based at least in part on whether the compatibility of the UE indicates the second compatibility. In some examples, the method 1700 further includes receiving an indication of the compatibility of the UE in a radio resource control message.

In some additional examples, the method 1700 also includes determining a first quasi co-location relationship between the first port at the first transmit/reception point and a second port at a second transmit/reception point that transmits a second portion of the single frequency networked composite reference signal, wherein transmitting the first portion of the single frequency networked composite reference signal is based at least in part on determining the first quasi co-location relationship.

In some examples, the method 1700 further includes periodically transmitting additional first portions of single frequency networked composite reference signals to the UE, wherein transmitting the first portion of the single frequency networked composite reference signal is based at least in part on periodically transmitting the additional first portions of the single frequency networked composite reference signals.

In some examples, the single frequency networked composite reference signal is a tracking reference signal or a demodulation reference signal. In other examples, the single frequency networked composite reference signal is associated with a physical downlink shared channel or a physical downlink control channel.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a single frequency networked composite reference signal at a first port of a user equipment (UE) single frequency networked composite reference signal, wherein receiving the single frequency networked composite reference signal comprises receiving the single frequency networked composite reference signal from a first transmit/reception point and a second transmit/reception point;
   receiving a reference signal at a second port of the UE that is different than the first port of the UE, wherein receiving the reference signal comprises receiving the reference signal from the first transmit/reception point or the second transmit/reception point; and
   performing channel estimation for at least one of the first port or the second port based at least in part on receiving the single frequency networked composite reference signal and the reference signal.

2. The method of claim 1, further comprising:
   transmitting, in a radio resource control message, an indication of a compatibility of the UE with one or more constraints, wherein receiving the single frequency networked composite reference signal is based at least in part on transmitting the indication of the compatibility of the UE.

3. The method of claim 1, further comprising:
   determining a first quasi co-location relationship between the first port and a demodulation reference signal port at the UE, wherein performing the channel estimation is based at least in part on determining the first quasi co-location relationship.

4. The method of claim 1, further comprising:
   periodically receiving an additional single frequency networked composite reference signal at the first port of the UE, wherein performing the channel estimation is based at least in part on periodically receiving the additional single frequency networked composite reference signal.

5. An apparatus for wireless communication, comprising:
   at least one processor; and
   at least one memory coupled with the at least one processor, with instructions stored in the at least one memory, the instructions being executable by the at least one processor, individually or in any combination, to cause the apparatus to:
   receive a single frequency networked composite reference signal at a first port of a user equipment (UE) single frequency networked composite reference signal, wherein receiving the single frequency networked composite reference signal comprises receiving the single frequency networked composite reference signal from a first transmit/reception point and a second transmit/reception point;
   receive a reference signal at a second port of the UE that is different than the first port of the UE, wherein receiving the reference signal comprises receiving the reference signal from the first transmit/reception point or the second transmit/reception point; and
   perform channel estimation for at least one of the first port or the second port based at least in part on receiving the single frequency networked composite reference signal and the reference signal.

6. The apparatus of claim 5, wherein the instructions to receive the single frequency networked composite reference signal are executable by the at least one processor to cause the apparatus to:

receive a first reference signal from the first transmit/reception point at a first frequency resource; and receive a second reference signal from the second transmit/reception point at the first frequency resource, wherein the first reference signal and the second reference signal comprise a same information.

7. The apparatus of claim 5, wherein the instructions to perform the channel estimation are executable by the at least one processor to cause the apparatus to:

determine a first channel condition parameter associated with the second port based at least in part on the reference signal; and determine a second channel condition parameter associated with the first port based at least in part on the single frequency networked composite reference signal and the first channel condition parameter.

8. The apparatus of claim 7, wherein the instructions to determine the second channel condition parameter are executable by the at least one processor to cause the apparatus to:

determine a first instance of the second channel condition parameter based at least in part on the single frequency networked composite reference signal; and subtract a first instance of the first channel condition parameter from the first instance of the second channel condition parameter to determine a second instance of the second channel condition parameter, wherein the second instance of the second channel condition parameter comprises the second channel condition parameter.

9. The apparatus of claim 5, wherein the instructions are further executable by the at least one processor to cause the apparatus to:

transmit, in a radio resource control message, an indication of a compatibility of the UE with one or more constraints, wherein receiving the single frequency networked composite reference signal is based at least in part on transmitting the indication of the compatibility of the UE.

10. The apparatus of claim 5, wherein the instructions are further executable by the at least one processor to cause the apparatus to:

determine a first quasi co-location relationship between the first port and a demodulation reference signal port at the UE, wherein performing the channel estimation is based at least in part on determining the first quasi co-location relationship.

11. The apparatus of claim 10, wherein the instructions are further executable by the at least one processor to cause the apparatus to:

determine a second quasi co-location relationship between the second port and a second demodulation reference signal port at the UE, wherein performing the channel estimation is based at least in part on determining the second quasi co-location relationship.

12. The apparatus of claim 5, wherein the instructions are further executable by the at least one processor to cause the apparatus to:

receive a downlink control information message indicating at least one transmission configuration indicator state identifier, wherein performing the channel estimation is based at least in part on receiving the downlink control information message.

13. The apparatus of claim 5, wherein the instructions are further executable by the at least one processor to cause the apparatus to:

periodically receive an additional single frequency networked composite reference signal at the first port of the UE, wherein performing the channel estimation is based at least in part on periodically receiving the additional single frequency networked composite reference signal.

14. The apparatus of claim 5, wherein the instructions are further executable by the at least one processor to cause the apparatus to:

periodically receive at least one additional reference signal at the second port of the UE, wherein performing the channel estimation is based at least in part on periodically receiving the at least one additional reference signal.

15. The apparatus of claim 5, wherein the instructions are further executable by the at least one processor to cause the apparatus to:

aperiodically receive at least one additional reference signal at the second port of the UE, wherein performing the channel estimation is based at least in part on aperiodically receiving the at least one additional reference signal.

16. The apparatus of claim 5, wherein the instructions are further executable by the at least one processor to cause the apparatus to:

determine that the first port has a lower port index than the second port; and determine whether a demodulation reference signal port is orthogonal or single frequency networked based at least in part on determining that the first port has the lower port index than the second port, wherein performing the channel estimation is based at least in part on determining whether the demodulation reference signal port is orthogonal or single frequency networked.

17. The apparatus of claim 5, wherein the instructions are further executable by the at least one processor to cause the apparatus to:

receive a downlink control information message that indicates at least one transmission configuration indicator state that identifies which port of a plurality of ports at the UE receives the single frequency networked composite reference signal, wherein receiving the single frequency networked composite reference signal at the first port of the UE is based at least in part on receiving the downlink control information message.

* * * * *